United States Patent
Kamisli et al.

(10) Patent No.: US 8,509,309 B2
(45) Date of Patent: *Aug. 13, 2013

(54) SELECTING TRANSFORMS FOR COMPRESSING VISUAL DATA

(75) Inventors: Fatih Kamisli, Cambridge, MA (US); Jae S. Lim, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/111,930

(22) Filed: May 19, 2011

(65) Prior Publication Data

US 2011/0286525 A1    Nov. 24, 2011

(51) Int. Cl.
*H04N 7/12* (2006.01)

(52) U.S. Cl.
USPC ........................................................ 375/240.2

(58) Field of Classification Search
None
See application file for complete search history.

(56) References Cited

U.S. PATENT DOCUMENTS

| | | | |
|---|---|---|---|
| 4,504,860 | A | 3/1985 | Nicol et al. |
| 5,432,555 | A | 7/1995 | Park |
| 5,495,244 | A | 2/1996 | Jeong et al. |
| 6,408,029 | B1 | 6/2002 | McVeigh et al. |
| 7,352,811 | B2 | 4/2008 | Stone et al. |
| 2003/0118117 | A1 | 6/2003 | McVeigh et al. |
| 2003/0128753 | A1 | 7/2003 | Lee et al. |
| 2003/0156648 | A1 | 8/2003 | Holcomb et al. |
| 2007/0053604 | A1 | 3/2007 | Lee et al. |
| 2007/0098063 | A1 | 5/2007 | Reznic et al. |
| 2007/0263721 | A1 | 11/2007 | Lim |
| 2007/0297503 | A1 | 12/2007 | Reznik |
| 2008/0008246 | A1 | 1/2008 | Mukherjee et al. |
| 2008/0273810 | A1 | 11/2008 | Subramania et al. |
| 2008/0310512 | A1 | 12/2008 | Ye et al. |
| 2010/0290520 | A1 | 11/2010 | Kamisli et al. |
| 2011/0286525 | A1 | 11/2011 | Kamisli et al. |

FOREIGN PATENT DOCUMENTS

JP    2008-197917    8/2008

OTHER PUBLICATIONS

Article—Haar wavelet transform with interband prediction and its application image coding; Nobutaka Kuroki, et al.; Graduate School of Science and Technology; Kobe University, Kobe, Japan 657.
Directional Discrete Cosine transforms—A New Framework for Image Coding; Bing Zeng, et al.; IEEE Transactions on Circuits and Systems for Video technology, vol. 18, No. 3, Mar. 2008.
Surface Compression with Geometric Bandelets; Gabriel Peyre, et al.; CMAP, Ecole Polytechnique; Copyright 2005 by the Association for Computing Machinery, Inc.; pp. 601-608.
Sparse Geometric Image Representations With Bandelets; Erwan Le Pennec et al.; IEEE Transactions of Image Processing, vol. 14, No. 4, Apr. 2005.

(Continued)

*Primary Examiner* — Nhon Diep
(74) *Attorney, Agent, or Firm* — Occhiuti Rohlicek & Tsao LLP

(57) ABSTRACT

Encoding data includes: computing a first set of coefficients based on a plurality of transforms each computed over a different portion of an array of data, a second set of coefficients based on a plurality of transforms each computed over a different portion of the array of data, and a third set of coefficients based on a transform computed over the array of data; choosing a set of coefficients to represent the array of data from a group of multiple sets of coefficients, the group including the first set of coefficients, the second set of coefficients, and the third set of coefficients; and encoding the chosen coefficients and one or more parameters related to the chosen coefficients.

196 Claims, 13 Drawing Sheets

(56) References Cited

OTHER PUBLICATIONS

One Dimensional Transform for H.264 Based Intra Coding; Yumi Sohn, et al.; Digital Media R&D Center; Samsung Electroncs, Co., Suwon, Korea; Picture Coding Symposium 2007; Nov. 7-9, 2007, Lisboa, Portugal.
Directional residue prediction with motion alignment for video coding; K. Zhang, et al.; Electronics Letters Sep. 11, 2008; vol. 44, No. 19.
Interframe Coding with Variable Block-size Motion Compensation; A. Pun, et al.; IEEE/IEICE Global Telecommunications Conference/ 1987; Conference Record vol. 1 of 3, pp. 65-69, 1987.
Overlapped Block Motion Compensation; Cheung Auyeung, et al.; P. Maragos, editor, Proc. SPIE vol. 1818, pp. 561-572, Visual Communications and Image Processing '92; Petros Maragos, Ed. vol. 1818 of Presented at the Society of Photo-Optical Instrumentation Engineers (SPIE) Conference; pp. 561-572, Nov. 1992.
Motion- and Aliasing-Compensated Prediction for Hybrid Video Coding; Thomas Wedi, et al.; IEEE Transactions on Circutis and Sysmes for Video Technology, vol. 13, No. 7, pp. 577-586, Jul. 2003.
The JPEG Still Picture Compression Standard; Gregory K. Wallace, et al.; Consumer Electronics, IEEE Transactions on vol. 38, No. 1, Feb. 1992.
Efficient Image Compression Using Directionlets; Vladan Velisavljevic, et al.; Information, Communications and Signal Processing, 2007 $6^{th}$ International Conference on, pp. 1-5, Dec. 10-13, 2007.
Directionlets: Anisotropic Multidirectional Representation with Separable Filtering; Vladan Velisavlievic, et al.; Image Processing IEEE Transactions on, 15(7), pp. 1916-1933; Jul. 2006.
Orientation Adaptive Subband Coding of Images; David Taubman, et al.; Image Processing; IEEE on; vol. 3, No. 4, pp. 421-437, Jul. 1994.
Prediction of Second-Order Statistics in Motion-Compensated Video Coding; Bo Tao, et al.; Image Processing, 1998; ICIP 98; Proceedings 1998 International Conference on, pp. 910-914 vol. 3, 407 Oct. 1998.
The Lifting Scheme: A Construction of Second Generation Wavelets; Wim Sweldens; Siam J. Math. Anal.; vol. 29, No. 2, pp. 511-546, Mar. 1998.
Rate-Distortion Optimized Motion Compensation for Video Compression Using Fixed or Variable Size Blocks; Gary J. Sullivan, et al.; Global Telecommunications Conference, 1996; GLOBECOM '91. 'Countdown to the New Millennium.
Coding the Displaced Frame Difference for Video Compression; Krishna Ratakonda, et al.; Image Processing, 1997; Proceedings, International Conference on, 1:353-356 vol. 1, Oct. 26-29, 1997.
Optimum Loop Filter in Hybrid Coders; Khee K. Pang; IEE Circuits and Systems for Video Technology; vol. 4, No. 2, Apr. 1994.
Overlapped Block Motion Compensation: An Estimation-Theoretic Approach; Michael T. Orchard, et al.; IEEE Transactions on Image Processing, vol. 3 No. 5, Sep. 1994.
An Overlapped Block Motion Compensation for High Quality Motion Picture Coding; Satoshi Nogaki, et al.; CUC Systems Research Laboratories, NEC Corporation; IEEE 1992.
Covariance Analysis of Motion-Compensated Frame Differences; Wolfgang Niehsen, et al.; IEEE Transactions on Circuits and Systems for Video Technology; vol. 9, No., Jun. 1999.
Very Low Bit-Rate Video Coding Based on Matching Pursuits; Ralph Neff, et al.; IEEE Transactions on Circuits and Systems for Video Technology, vol. 7, No. 1, Feb. 1997.
Adaptive Deblocking Filter; Peter List, et al.; IEEE Transactions and Systems for Video Technology, vol. 13, No. 7, Jul. 2003.
Loop-filtering and Post-filtering for Low Bit-rates Moving Picture Coding; Y.L. Lee, et al.; Image Processing, 1999; ICIP 99. Proceedings 1999 International Conference on, 1:94-98 vol. 1, 1999.
Shape-Adaptive DCT with Block-Based DC Separation and ΔDC Correction; Peter Kauff, et al.; IEEE Transactions on Circuits and Systems for Video Technology, vol. 8, No. 3, Jun. 1998.
Extended Analysis of Motion-Compensated Frame; Difference for Block-Based Motion Predictin Error; Ko-Cheung Hui, et al. IEEE Transaction on Image Processing, vol. 16, No. 5, May 2007.
Why B-Pictures Work: A Theory of Multi-Hypothesis Motion-Compensated Prediction; Bernd Girod; Image Processing, 1998; ICIP 98; Proceedings 1998 International Conference on, 2:213-217 vol. 2, Oct. 4-7, 1998.
The Efficiency of Motion-Compensating Prediction for Hybrid Coding of Video Sequences; Bernd Girod; IEEE Journal on Selected Areas in Communications; vol. SAC-5, No. 7, Aug. 1987.
Motion-Compensating Prediction with Fractional-Pel Accuracy; Bernd Girod; IEEE Transactions on Communications, vol. 41, No. 4, Apr. 1993.
Efficiency Analysis of Multihypothesis Motion-Compensated Prediction for Video Coding; Bernd Girod; IEEE Transactions on Image Processing, vol. 9, No. 2, Feb. 2000.
Multihypothesis Motion Estimation for Video Coding; Markus Flierl, et al.; Data Compression Conference, 2001; Proceedings DCC 2001; pp. 341-350; 2001.
A New Bidirectionally Motion-Compensated Orthogonal Transform for Video Coding; Markus Flierl, et al.; pp. 665-668 Proc. IEEE International Conference on Acoustics, Speech, and Signal Processing, Honolulu, HI; Apr. 2007.
Efficient, Robust, and Fast Global Motion Estimation for Video Coding; Frederic Dufaux, et al.; IEEE Transactions on Image Processing, vol. 9, No. 3, Mar. 2000.
The Optimal Transform of Motion-Compensated Frame Difference Images in a Hybrid Coder; Chi-Fa Chen, et al. IEEE Transactions on Circuits and Systems-II: Analog and Digital Signal Processing, vol. 40, No. 6, Jun. 1993.
Variable size block matching motion compensation with applications to video coding; M.H. Chan, PhD, et al.; Communications, Speech and Vision, IEE Proceedings I; 137(4):205-212; Aug. 1990.
Direction-Adaptive Discrete Wavelet Transform for Image Compression; Chuo-Ling Chang, et al.; IEEE Transactions on Image Processing, vol. 16, No. 5, May 2007.
Image Coding Using Wavelet Transform; Marc Antonini, et al.; IEEE Transactions on Image Processing, vol. 1, No. 2, pp. 205-220; Apr. 1992.
Directional Discrete Cosine Transforms for Image Coding; Bing Zeng, et al.; Multimedia and Expo, 2006 IEEE International Conference; pp. 721-724, Jul. 9-12, 2006.
International Search Report and Written Opinion, Patent Cooperation Treaty, PCT/US2010/033953, mailed Dec. 15, 2010, 9 pages.
Kamisli, F. Lim, J.S., Transforms for the motion compensation residual, ICAS SP 2009. IEEE International Confernece on Apr. 19-24, 2009, pp. 789-792.

SELECTING TRANSFORMS FOR COMPRESSING VISUAL DATA

CROSS-REFERENCE TO RELATED APPLICATIONS

This application is a continuation-in-part of U.S. application Ser. No. 12/465,961, filed on May 14, 2009, incorporated herein by reference.

BACKGROUND

This description relates to selecting transforms for compressing visual data.

Compression of visual data is important because raw visual data such as images and video typically require a lot of bits for their representation. Compression allows for storage and transmission of visual data using a smaller number of bits. Compression is achieved by exploiting temporal and/or spatial redundancies in visual media. This may involve predicting an image or video frame based on other compressed or encoded images or frames. The difference between the predicted frame and the actual frame is known as a prediction residual. Prediction residuals or their transforms are often stored or transmitted instead of the actual frame as a method of compression.

SUMMARY

In one aspect, in general, a method of encoding data includes: computing a first set of coefficients based on a plurality of transforms each computed over a different portion of an array of data, a second set of coefficients based on a plurality of transforms each computed over a different portion of the array of data, and a third set of coefficients based on a transform computed over the array of data; choosing a set of coefficients to represent the array of data from a group of multiple sets of coefficients, the group including the first set of coefficients, the second set of coefficients, and the third set of coefficients; and encoding the chosen coefficients and one or more parameters related to the chosen coefficients.

Aspects can include one or more of the following features.

The plurality of transforms on which the first set of coefficients are based are aligned along a first direction.

The plurality of transforms on which the second set of coefficients are based are aligned along a second direction different from the first direction.

The second direction is 90° from the first direction.

The group of multiple sets of coefficients consists of two sets of coefficients that are based on a plurality of transforms, and one or more sets of coefficients that are based on a single transform.

The group of multiple sets of coefficients consists of: the first set of coefficients based a plurality of transforms aligned along a vertical direction, the second set of coefficients based on a plurality of transforms aligned along a horizontal direction, and one or more sets of coefficients that are based on a single transform.

The plurality of transforms each computed over a different portion of the array of data comprise a plurality of one-dimensional transforms.

Computing the first set of coefficients includes dividing the array of data into a plurality of one-dimensional arrays.

The plurality of one-dimensional arrays are non-overlapping.

One or more of the plurality of one-dimensional arrays are overlapping.

The first set of coefficients includes coefficients resulting from the plurality of one-dimensional transforms each computed over a different one of the plurality of one-dimensional arrays.

The group of multiple sets of coefficients includes the first set of coefficients, the second set of coefficients, the third set of coefficients, and one or more additional sets of coefficients.

Each of one or more of the additional sets of coefficients is computed based on a plurality of transforms each computed over a different portion of the array of data.

Computing a given one of the additional sets of coefficients includes dividing the array of data into a plurality of one-dimensional arrays that cover most of the array of data, and computing a one-dimensional transform over each of the plurality of one-dimensional arrays.

Different ones of the additional sets use different patterns of one-dimensional arrays to cover most of the array of data.

Different patterns correspond to different directions for the one-dimensional arrays.

At least one of the additional sets of coefficients is computed based on a transform computed over the array of data.

The one or more parameters identify one of a plurality of scanning patterns used to order a list of coefficients in the first set of coefficients.

The scanning pattern identified depends on which of the candidate sets of coefficients is chosen as the first set of coefficients.

The first set of coefficients is chosen from among the plurality of candidate sets of coefficients based on which of the candidate sets of coefficients represents the array of data with a maximum compression.

The one or more parameters identify at least one transform used to generate the chosen first or third set of coefficients.

The one or more parameters identify a pre-defined pattern of one-dimensional arrays over which the plurality of transforms are computed if the first set of coefficients is chosen.

The transform computed over the array of data comprises a two-dimensional transform.

The one or more parameters identify one of multiple two-dimensional transforms used to compute the third set of coefficients if the third set of coefficients is chosen.

The two-dimensional transform comprises a two-dimensional discrete cosine transform.

The two-dimensional transform comprises a two-dimensional discrete wavelet transform.

At least one of the plurality of one-dimensional transforms comprises a discrete cosine transform.

At least one of the plurality of one-dimensional transforms comprises a discrete wavelet transform.

One set of coefficients of the group of multiple sets of coefficients is chosen to represent the array of data based on which set of coefficients represents the array of data with a maximum compression.

Each set of coefficients in the group of multiple sets of coefficients is computed based on at least one transform from a group of multiple transforms.

The group of multiple transforms includes the plurality of transforms on which computation of the first set of coefficients is based and the transform on which computation of the third set of coefficients is based.

The method further comprises, before computing the first and third sets of coefficients, eliminating one or more transforms from the group of multiple transforms from consideration for computing any of the group of multiple sets of coefficients based on estimated characteristics of the array of data.

Encoding the chosen coefficients includes discarding at least one coefficient based on a predetermined threshold.

The array of data is associated with a video frame.

The array of data corresponds to a block of pixels of the video frame.

The array of data is associated with a residual computed from two video frames.

The residual is based on motion compensation between the two video frames.

The residual is based on resolution enhancement between the two video frames.

The residual is obtained by subtracting pixel values of one of the frames from corresponding pixel values in another of the frames.

In another aspect, in general, a method of encoding blocks of a video residual includes: computing a first set of coefficients based on a plurality of one-dimensional transforms each computed over a different portion of a block, a second set of coefficients based on a plurality of transforms each computed over a different portion of the array of data, and a third set of coefficients based on a two-dimensional transform computed over the block; choosing a set of coefficients to represent the block from a group of multiple sets of coefficients, the group including the first set of coefficients, the second set of coefficients, and the third set of coefficients; and encoding the chosen coefficients and one or more parameters related to the chosen coefficients.

In another aspect, in general, a computer-readable medium stores a computer program for encoding data. The computer program comprises instructions for causing a computer system to: compute a first set of coefficients based on a plurality of transforms each computed over a different portion of an array of data, a second set of coefficients based on a plurality of transforms each computed over a different portion of the array of data, and a third set of coefficients based on a transform computed over the array of data; choose a set of coefficients to represent the array of data from a group of multiple sets of coefficients, the group including the first set of coefficients, the second set of coefficients, and the third set of coefficients; and encode the chosen coefficients and one or more parameters related to the chosen coefficients.

In another aspect, in general, a method is used to decode data that has been encoded using a method comprising computing a first set of coefficients based on a plurality of transforms each computed over a different portion of an array of data, a second set of coefficients based on a plurality of transforms each computed over a different portion of the array of data, and a third set of coefficients based on a transform computed over the array of data, and choosing a set of coefficients to represent the array of data from a group of multiple sets of coefficients, the group including the first set of coefficients, the second set of coefficients, and the third set of coefficients. The method of decoding the data comprises: receiving encoded coefficients and one or more parameters related to the encoded coefficients; and computing an inverse transform on the encoded coefficients to generate the array of data, where the inverse transform is based on a transform indicated by at least one of the parameters related to the encoded coefficients.

In another aspect, in general, a computer-readable medium stores a computer program for decoding data that has been encoded using a method comprising computing a first set of coefficients based on a plurality of transforms each computed over a different portion of an array of data, a second set of coefficients based on a plurality of transforms each computed over a different portion of the array of data, and a third set of coefficients based on a transform computed over the array of data, and choosing a set of coefficients to represent the array of data from a group of multiple sets of coefficients, the group including the first set of coefficients, the second set of coefficients, and the third set of coefficients. The computer program comprises instructions for causing a computer system to: receive encoded coefficients and one or more parameters related to the encoded coefficients; and compute an inverse transform on the encoded coefficients to generate the array of data, where the inverse transform is based on a transform indicated by at least one of the parameters related to the encoded coefficients.

In another aspect, in general, a system comprises: a transmitter configured to compute a first set of coefficients based on a plurality of transforms each computed over a different portion of an array of data, a second set of coefficients based on a plurality of transforms each computed over a different portion of the array of data, and a third set of coefficients based on a transform computed over the array of data, choose a set of coefficients to represent the array of data from a group of multiple sets of coefficients, the group including the first set of coefficients, the second set of coefficients, and the third set of coefficients, and encode the chosen coefficients and one or more parameters related to the chosen coefficients. The system also includes one or more receivers, each receiver configured to receive encoded coefficients and one or more parameters related to the encoded coefficients from the transmitter, and compute an inverse transform on the encoded coefficients to generate the array of data, where the inverse transform is based on a transform indicated by at least one of the parameters related to the encoded coefficients.

Among the many advantages of the invention (some of which may be achieved only in some of its various aspects and implementations) are the following.

Transform coefficients to represent an array (e.g., a block) of visual data can be selected based on which transform or set of transforms result in the most efficient compression of the block. Locally anisotropic features of visual data may result in one of the transforms more effectively compressing the visual data. For example, in the case of prediction residuals for video frames, prediction errors in smooth and slowly moving regions are smaller than in moving texture regions or edges. Further, shapes of objects may tend to change slightly from frame to frame and prediction around object boundaries may have more errors. In such cases, instead of computing one predetermined transform, a suitable transform may be chosen from several transforms computed on the same data array.

By including both at least one two dimensional transform over a block and one or more sets of one dimensional transforms over the block as candidates for transforms to be computed on a given block, efficiency can be increased since some blocks in residuals or other frames or images are better suited for one than the other.

For directional one dimensional transforms, several directions can be defined depending on a type of data or application.

Cost functions for choosing a best transform for a given data array may be defined and adapted based on types of data and application. This method of choosing allows for an efficient and possibly user defined method of choosing a suitable transform from a plurality of available transforms rather than using a single predefined transform for all cases.

Savings in bitrate are achieved in transmitting or storing compressed visual data. Such savings result in efficient use of bandwidth and/or memory in video and image communication systems.

Other features and advantages of the invention will become apparent from the following description, and from the claims.

DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
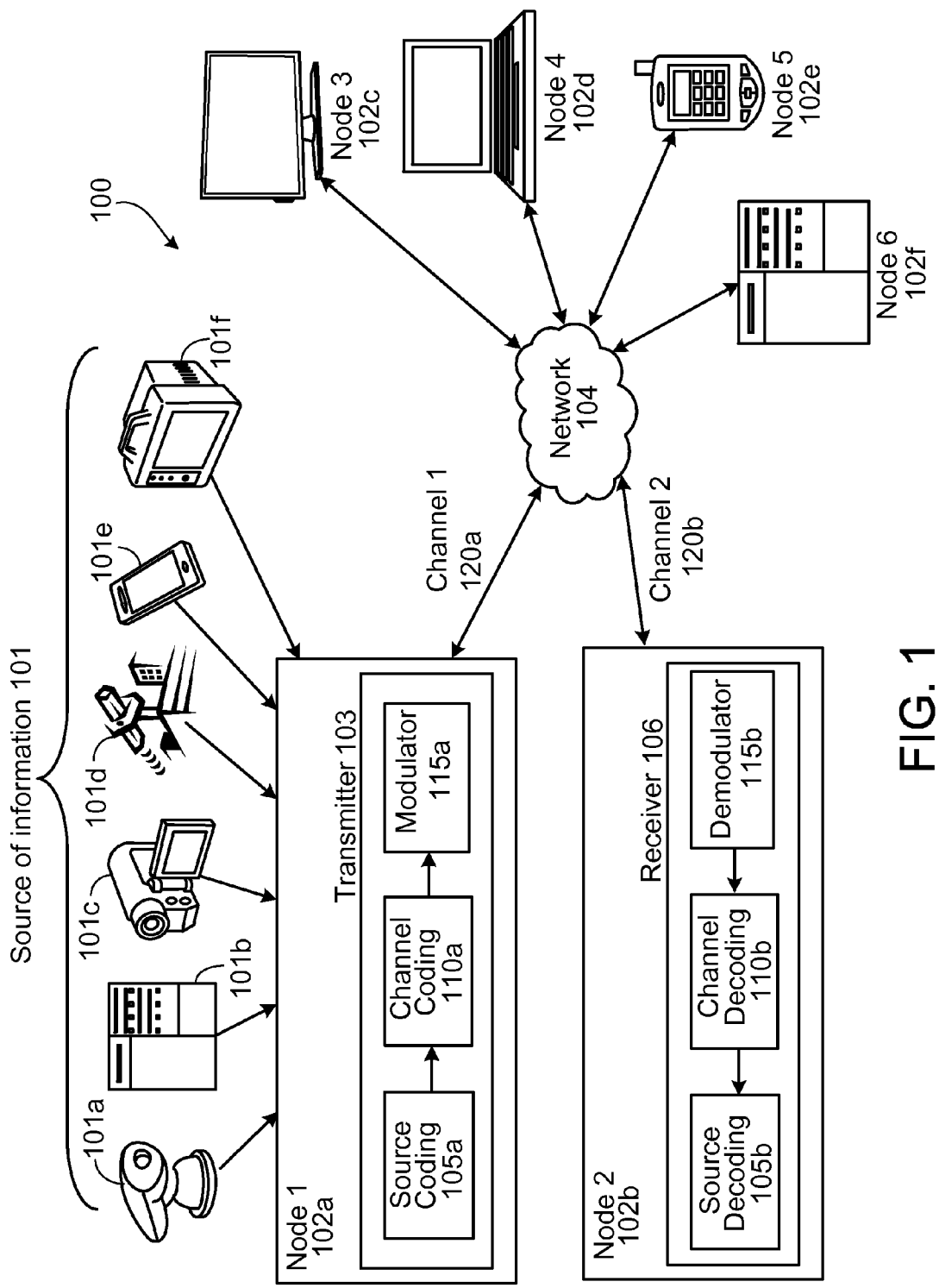
FIG. 1 is an example of a video communication system.

FIG. 1 shows an exemplary system 100 for communicating data over a network. In broad overview, the system 100 includes one or more nodes 102a-102f (102 in general) connected over a network 104. The nodes 102 may transmit and/or receive information from other nodes in the network 104. In some implementations, the information includes visual data such as images or video. The video or images may come from one or more sources 101 such as a webcam 101a, a video or still camera 101c, a surveillance camera 101d or a wireless handheld gadget 101e such as a phone or a personal digital assistant (PDA). In some implementations, the source of information may be a file stored electronically in a server 101b or any other computing device. In some implementations, the source of information may be a medical device 101f that may transmit visual or other forms of data to a remote location. The source of information 101 may also include, for example, any sensor, detector, recorder, or analyzer that can detect, derive, capture, store or record visual information such as video or images. In some implementations, a source of information 101 may combine a plurality of sources including, but not limited to, the sources described above. The source of information 101 may reside in any facility, location or vehicle. For example, the source of information 101 may be a security camera deployed in a building or campus. In another implementation, the source of information may be carried around by a user. In some implementations, the source of information 101 may be an imager or detection devices on a satellite. In other implementations, the source of information 101 may be deployed on a vehicle such as aircrafts, ships or other manned or unmanned vehicles. The sources of information 101 may communicate with a node 102 that is connected to the network 104. In some implementations, the source of information 101 may be a part of the node 102. In other implementations, the source of information 101 may communicate with the node 102 via one or more networks and/or one or more intervening devices. Any hardware or software may be used to facilitate communication between the source 101 and the node 102.

The node 102 may include devices capable of receiving and displaying or rendering images and/or video. For example, the node could be a television or display device 102c. The node could be a desktop or laptop computer 102d. The node could also be a wireless device 102e such as a PDA or a mobile phone that is capable of receiving, storing or displaying images and video. In some implementations, the node could be a storage device such as a server 102f or memory capable of storing the information. Such a server or memory may be optionally connected to a device capable of retrieving and displaying visual information.

In some implementations, a node 102a (node 1 in FIG. 1) includes a transmitter 103. The transmitter 103 may be configured to encode data from the source 101 and transmit encoded data over the network 104. In some implementations, the transmitter 103 may include components for source coding 105a and channel coding 110a. The transmitter 103 may also include a modulator 115a. The transmitter may also include one or more components or devices for converting data from the source 101 into a format suitable for source coding.

Source coding 105a may also be referred to as a data compression technique. Source coding may involve encoding schemes engineered to reduce the number of bits required for representing a given image, video or other types of information. Source coding 105a may include lossless compression techniques (for example, Lempel Ziv compression, Arithmetic coding, etc.) or lossy compression techniques. In some implementations, especially when transmissions over a network are involved, lossy compressions may be preferred since it reduces bandwidth required to transmit information. Examples of lossy compression techniques used in source coding 105a may include transform coding involving mathematical transforms such as discrete cosine transform (DCT), discrete sine transform (DST), discrete wavelet transform (DWT), fractal compression, and discrete Fourier transform (DFT). In some implementations, source coding may be in accordance with one or more standards. Such standards may include video standards such as MPEG-2, MPEG-4, H.263 and H.264. Such standards may also include image compression standards such as JPEG. In some implementations, a lossy compression scheme may also include model coding where an image or video frame is mathematically modeled and parameters of the model are encoded.

Channel coding 110a refers to addition of redundant bits in information to be transmitted across a channel. Channel coding may facilitate error detection and/or error correction at a receiver end and increases the reliability of a transmission. Channel codes may also be referred to as error correction codes. Channel coding 110a may include the use of codes such as block codes, convolutional codes, turbo codes and low density parity check (LDPC) codes.

The transmitter may include a modulator 115a. A modulator 115a may modulate an analog carrier in accordance with a stream of digital bits. The modulator may use any digital modulation techniques including, for example, phase shift keying (PSK), frequency shift keying (FSK), amplitude shift keying (ASK), quadrature amplitude modulation (QAM), pulse position modulation (PPM), on-off keying (OOK), minimum shift keying (MSK), continuous phase modulation (CPM), Trellis coded modulation (TCM), and orthogonal frequency division multiplexing (OFDM).

In some implementations, a node 102b (node 2 in FIG. 1) includes a receiver 106 that is configured to receive information from another node 102 on the network. Even though FIG. 1 shows the transmitter 103 and receiver 106 to be on different nodes, it should be appreciated that any node 102 may have one or more transmitters and/or one or more receivers. Also, the transmitter 103 and/or the receiver 106 may be a part of any node 102. The receiver 106 may include one or more of a demodulator 115b, a channel decoder 110b and a source decoder 105b. The demodulator 115b typically does an inverse operation to that of the modulator 115a to recover digital bits from a received modulated analog signal. Similarly, the channel decoder 110b and source decoder 105b typically perform inverse operations to that performed by the channel coder 110a and source coder 105a, respectively. In some implementations, the receiver 106 may be connected to a display for rendering the received video or image data. Any software and additional hardware may be used for such rendering. The receiver 106 may be connected to a storage medium to store the received digital data.

The nodes 102 may be connected via a network 104. Although FIG. 1 shows only one network 104 connecting the nodes, there may be a plurality of such networks interconnected with each other. The networks can be the same type of network or different types of networks. The network 104 can be a local-area network (LAN), such as a company Intranet, a metropolitan area network (MAN), or a wide area network (WAN), such as the Internet or the World Wide Web. In one implementation, the network 104 may include one or more of a private network and a public network.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 104 may comprise a wireless link, such as an infrared channel or satellite band. The topology of the network 104 may be a bus, star, or ring network topology. The network may include any number of repeaters, appliances, devices, servers, storage media and queues.

The network 104 supports one or more channels 120 between nodes connected to the network. For example the nodes 102a and 102b may be connected by a channel. In some implementations, the channel 120 may include two or more different channels, such as channel 120a and channel 120b. The channels 120a and 120b may have substantially same or different channel characteristics. In some implementations, some of the channel characteristics of the channels 120a and 120b may be the same while some other channel characteristics may be different. In general, a channel may be defined as properties of at least a part of a medium over which two nodes communicate with each other.

Figure 2:
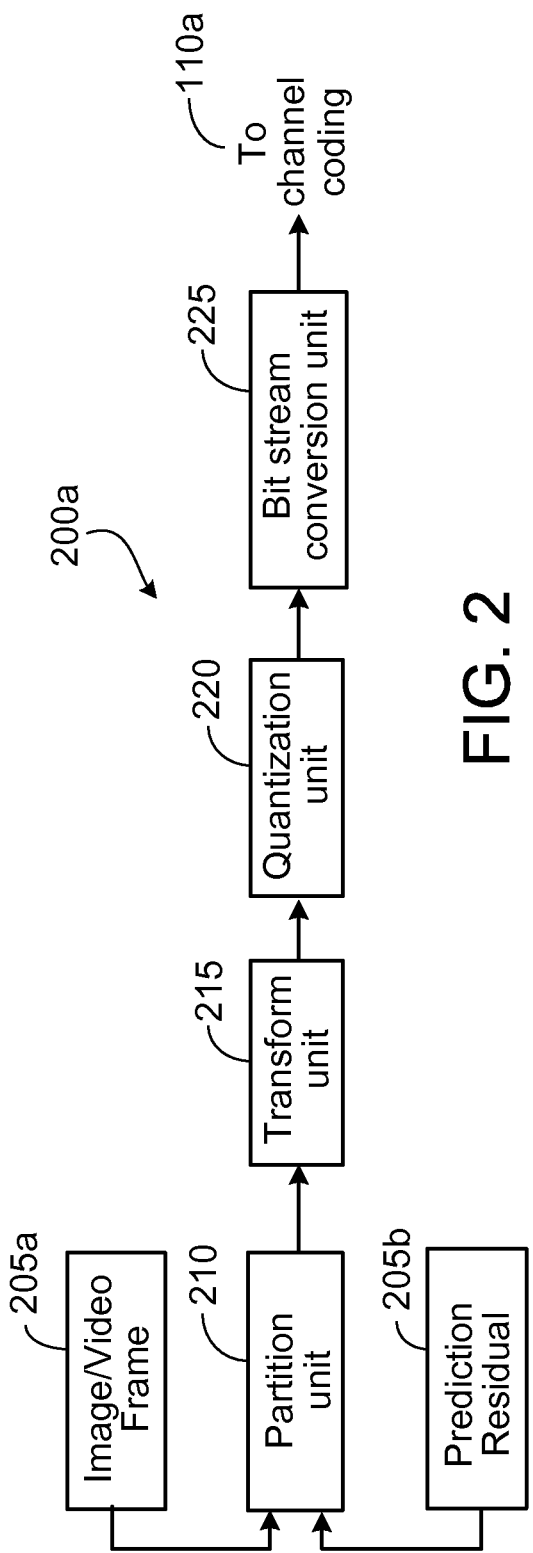
FIG. 2 is a block diagram of an exemplary source coding system.

Referring now to FIG. 2, a block diagram of an exemplary system 200a for implementing the source coding 105a is shown and described. The system 200a includes a partition unit 210 that partitions or divides a data array (e.g., an image, frame, or residual, as described in more detail below) into multiple subparts which are themselves arrays of data called blocks. In some implementations, the blocks are square arrays of pixels, where each pixel value can be encoded in any of a variety of formats. The system 200a also includes a transform unit 215 that transforms data from one domain to another. The system 200a includes a quantization unit 220 that converts image or transform coefficients into quantized numbers. In some implementations, the system 200a includes a bit stream conversion unit 225 that converts the quantized numbers to streams of bits.

The data array (205 in general) may be of different types and forms. In some cases, the data array 205 is an image 205a (e.g., either an individual image or an image that is a video frame). In some cases, the data array 205 is a prediction residual 205b related to a video frame. In some cases, some of the data arrays 205 are video frame images while other data arrays 205 are prediction residuals. In some cases, a data array 205 includes some portions that encode portions of a video frame image directly and other portions that encode prediction residuals for portions of the video frame image. In such cases, whether a portion of the video frame image is encoded directly or as a prediction residual can be determined based on which can be more efficiently compressed by the transform unit 215, as described in more detail below. The data arrays 205 in the following examples are two-dimensional arrays. Alternatively, similar techniques can be applied to arrays of different dimensions.

The data array 205 is partitioned into subparts via the partition unit 210. The partition unit 210 may partition a data array 205 in a variety of ways. For example, the partition unit may divide a data array 205 into multiple two-dimensional arrays. In some implementations, where the data array 205 has a dimension of three or higher, the partition unit 210 may divide the data array 205 into multiple partitions having lower dimensions. For example, a three dimensional data array 205 may be divided into multiple two-dimensional slices. A three-dimensional array may also be divided into smaller three dimensional blocks. The partition unit 210 may divide the data in a homogenous or non-homogenous fashion. For example, part of a two-dimensional array 205 (such as an image 205a or a video or residual frame 205b) may be partitioned into smaller two-dimensional blocks whereas another part of the two-dimensional array 205 may be partitioned into larger two-dimensional blocks. In some implementations, the partition unit may introduce one or more identifying parameters corresponding to each partition such that the original data array may be reconstructed from the partitions. In some implementations, the partition unit 210 may pass on the data array 205 without dividing it into any subparts. Whether or not the partition unit 210 divides the data array into subparts, may be governed by one or more parameters or a nature of the data array.

The transform unit 215 transforms an array (e.g., a partitioned block or an entire data array 205) from one domain to another. For example, the transform unit 215 transforms data from a spatial domain to a frequency domain. Transforms computed by the transform unit 215 may include, for example, one or more of discrete cosine transform (DCT), discrete sine transform (DST), discrete wavelet transform (DWT), fractal compression, and discrete Fourier transform (DFT). Typically, the transform unit 215 facilitates representation of the array using fewer coefficients than there are pixels in the received array. The transform unit 215 may compute any combination of one-dimensional, two-dimensional, or higher-dimensional transform.

The transform unit 215 may be used to compress different types of data arrays. In some implementations, such as in image compression, the pixels representing image intensities are transformed. In other implementations, such as in video compression, pixels representing prediction residuals may be transformed. Examples of prediction residuals include the motion-compensation-residual (MC-residual), the resolution-enhancement-residual (RE-residual) which is often used in scalable video coding, the disparity-compensation-residual (DC-residual) often used in multiview coding, and intra prediction residual often used in H.264/AVC. Typically, transforms used to compress images may also be used to compress prediction residuals. For example, the Discrete Cosine Transform (DCT) may be used to compress images and MC-residuals. Another example of such transforms is the Discrete Wavelet Transform (DWT), which may be used to compress images as well as residual frames.

The choice of transform performed by the transform unit 215 may be governed by the characteristics of the data array 205. For example, when the data array is an image that can be classified as a first order Markov signal, the choice of transform may be a DCT since the DCT is a statistically optimal transform for such a class of signal. In some cases, prediction residuals may have different characteristics from images. In such cases, typical features of prediction residuals may be used for determining a suitable transform. Prediction residuals represent errors in predicting image intensities from previously encoded image intensities. For some types of data, such as for MC-residuals, prediction errors in smooth and slowly moving regions are smaller than in moving texture regions or edges. Also, in some implementations, motion-compensated prediction accounts only for translational motion, whereas real-world objects have other motions such as rotation. In such cases the shapes of objects may tend to change slightly from frame to frame. As a result, the prediction around object boundaries may have more errors.

For RE-residuals, prediction errors in smooth regions are much smaller than in detailed texture regions or around edges. For such prediction residuals, large prediction errors may concentrate in detailed texture regions or along edges.

In situations as described above, one-dimensional structures along edges may occur in some regions of the residuals. For example, within a local neighborhood, many pixel intensities may be close to zero except those ones along the edges. In such cases, two-dimensional transforms with basis functions that have square support may not be the best choice of transform. Transforms with basis functions whose support follow the one-dimensional structures of the prediction residuals may be more appropriate for such cases. For example, one-dimensional directional DWT's or DCT's may be used with prediction residuals that have the above characteristics.

In some implementations, two-dimensional (2-D) transforms may be implemented as separable one-dimensional (1-D) transforms. For example a 2-D DCT or a 2-D Discrete Wavelet Transform (DWT) may be carried out as a separable transform by cascading two 1-D transforms in the vertical and horizontal directions. In some cases, such 1-D transforms favor horizontal or vertical features over others. In some implementations, transforms may be used to adapt to locally anisotropic features by performing filtering along a direction where the image intensity variations are smaller. This may be achieved by various methods including, for example, performing filtering and subsampling on oriented sublattices of a sampling grid and directional lifting implementations of the wavelet transform. The directional transforms may be 1-D or 2-D DCT's, DWT's, or other transforms may be used for such directional transforms.

The transform unit 215 may further include hardware or software to select or discard one or more of the computed transform coefficients. For example, the transform unit may select only non-zero coefficients of a computed transform for further processing. In some implementations, coefficients of a computed transform may be selected based on a threshold, such that coefficients below the threshold are not selected. Coefficients may also be selected based on one or more of a value of the coefficient, a location of the coefficient in the computed transform array, information content of the coefficient, and other application or user specific criteria. In some implementations, the transform unit may pass an incoming signal without transformation. For example, if the transform unit 215 includes a digital filter with a delta function impulse response, the incoming signals will be passed through the unit 215 substantially unchanged. The transform unit 215 can be configured to apply a transform or pass a signal without transformation selectively for a given block.

The choice of transform performed by the transform unit 215 may be governed by the nature of the data array 205. For example, when the data array can be classified as a first order Markov signal, the choice of transform may be a DCT since the DCT is a statistically optimal transform for such a class of signal.

In some implementations, a quantization unit 220 may be used to represent a range of values using a single representative value. For example, values of transform coefficients may be of continuous nature and the quantization unit 220 may represent such coefficients using a limited number of discrete values. The quantization unit 220 may perform operations such as round, ceiling, floor, modulo and threshold. The quantization unit 220 may represent the transform coefficients in a variety of ways. For example, in some implementations, the quantization unit 220 represents a transform coefficient as the next highest or lowest integer. In other implementations, the quantization unit 220 may represent a coefficient up to two decimal places. The quantization unit 220 may use different methods to quantize different coefficients. For example, consider a one-dimensional array of coefficients: [58 −51 −15 −12]. A corresponding quantization array may be defined as: [24 40 51 61], for which the quantized values will be: [2 −1 0 0], the operation being dividing each element of the coefficient array by the corresponding value in the quantization array and then rounding to the nearest integer. In other implementations, a homogenous quantization may also be used where each coefficient is quantized in a substantially same way.

The bit stream conversion unit 225 converts numbers to streams of bits. Typically, the numbers will be converted to binary representations. Bits may be physically represented in various ways such as different levels of voltage, current, or a presence or absence of a signal. The bit streams coming out of the bit stream conversion unit may represent the source coded form of the input data array 205. In some implementations, these bit streams are used as input to channel coding units 110a. The bit stream conversion unit 225 may include hardware and/or software for implementing coding schemes such as Huffman coding, variable length coding or other cryptographic coding schemes.

The partition unit 210, the transform unit 215, the quantization unit 220 and the bit stream conversion unit 225 may be implemented using any of a variety of particular hardware modules. For example any of these units may be implemented using one or more of a microprocessor, a microcontroller, and a digital signal processors (DSP). Implementations may include hardware circuits such as sample and hold circuits, adders, multipliers, shift registers, logic gates, transistors, flip flops, switches, capacitors, resistors, inductors, buses, cache memories, timing circuits and diodes. A variety of types of algorithms and/or software running on one or more programmed processors may be used in computing the transforms, quantization, partitioning or conversion to bit streams.

Figure 3:
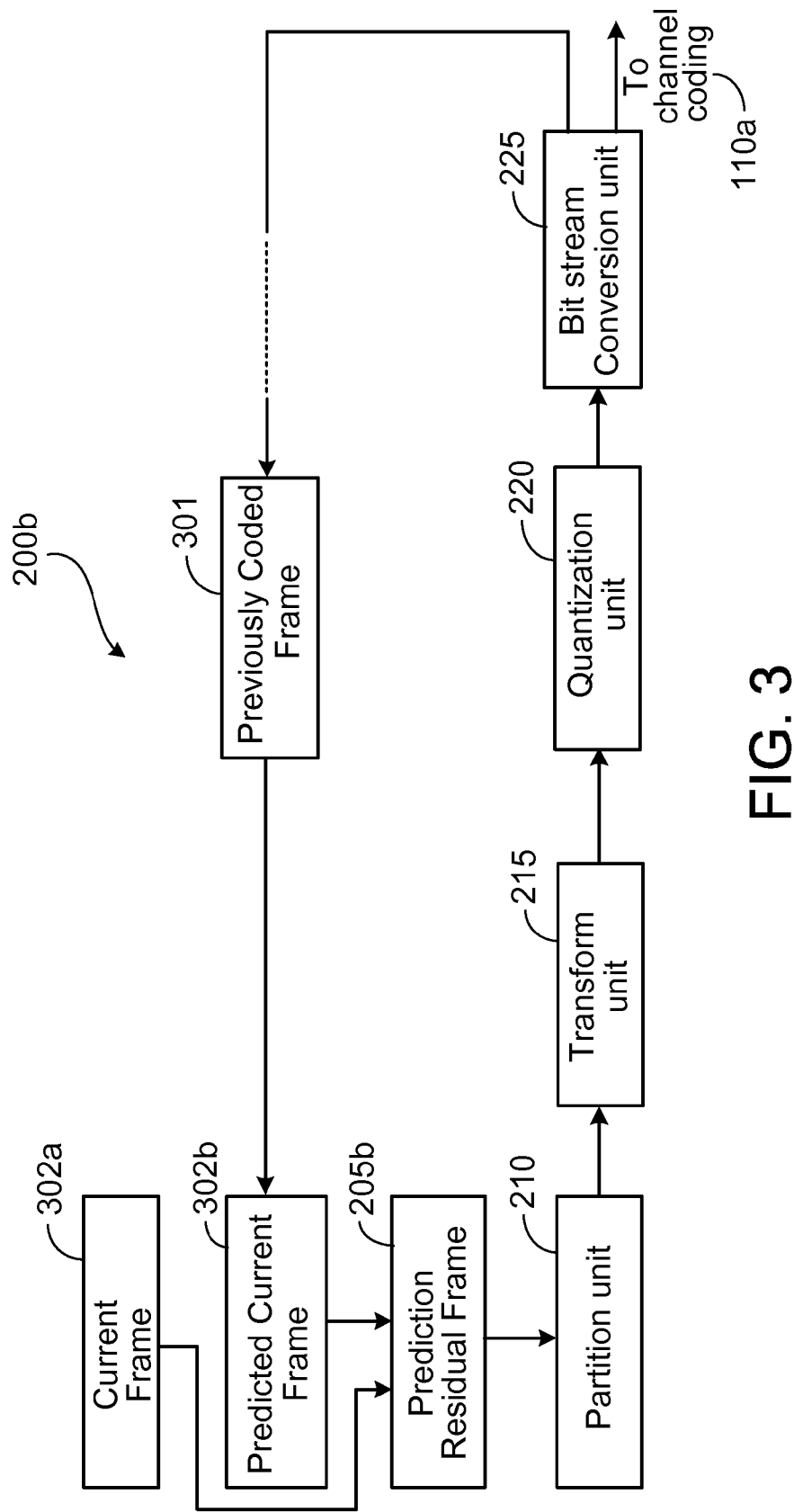
FIG. 3 is a block diagram of an exemplary source coding system used for coding video frames.

Referring now to FIG. 3, another example of a system 200b for source coding of video frames is shown and described. In some implementations, the system 200b obtains the prediction residual frame 205b from a current frame 302a and a predicted version 302b of the current frame. The predicted current frame 302b may be obtained from one or more previously coded frames 301. In one implementation, the predicted current frame 302b is obtained from a single previously coded frame. In another implementation, the predicted current frame 302b is obtained from multiple previously coded frames. In some implementations, one or more future frames (with respect to frame presentation times) may also be used to obtain the predicted current frame 302b. In other words, any combination of forward and backward predictions may be used to obtain the predicted current frame.

In some implementations, the predicted current frame 302b is obtained using transform coefficients related to at least one previously coded frame 301. In other implementations, the predicted current frame 302b is obtained using intensity values from at least one previously coded frame 301. The previously coded frame(s) 301 may be retrieved from a buffer or may be reconstructed from related transform coefficients. In some implementations, obtaining the predicted current frame 302b may involve operations such as linear prediction, non-linear prediction and interpolation, and may involve estimating and using motion vectors. In some implementations, the predicted current frame 302b is computed using existing correlation between adjacent frames in a video stream.

The predicted current frame 302b may be compared to a current frame 302a to obtain the prediction residual frame 205b. In some implementations, differences in values of intensity of corresponding pixels in the current frame 302a and the predicted current frame 302b are calculated to obtain the prediction residual frame 205b. In other words, the prediction residual frame 205b represents a difference image between the current frame 302a and the predicted current frame 302b. Other operations between the current frame 302a and the predicted current frame 302b may alternatively be performed to obtain the prediction residual frame 205b. For example, in some implementations, differences between transform coefficients of the current frame 302a and the predicted current frame 302b are computed in order to obtain the prediction residual frame 205b. The prediction residual frame may be passed through one or more of the partition unit 210, transform unit 215, quantization unit 220 and bit stream conversion unit 225 which have been described with respect to FIG. 2.

Figure 4:
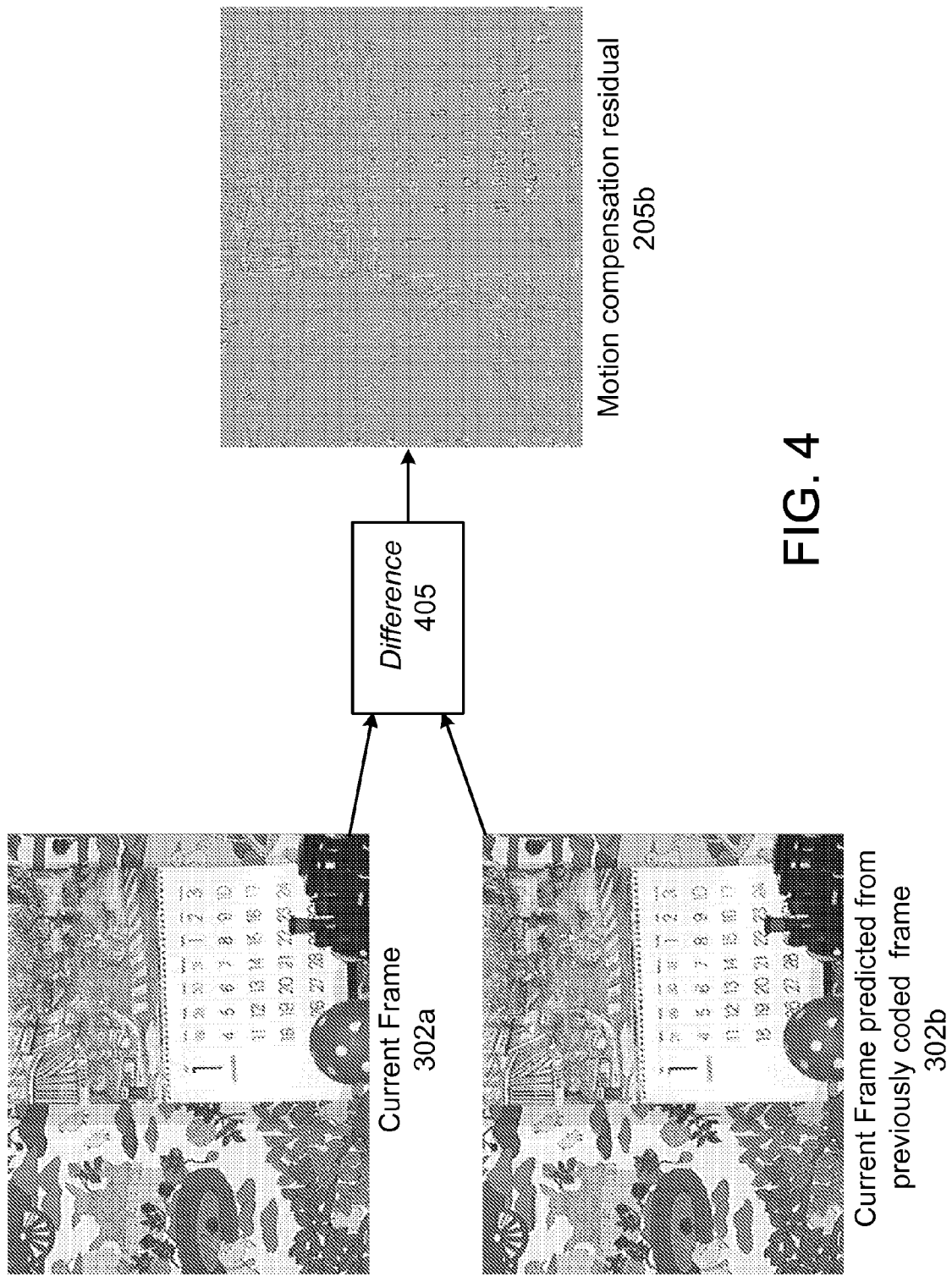
FIG. 4 is an example of obtaining a prediction residual frame in motion compensation.

FIG. 4 shows an example of obtaining a prediction residual frame for motion compensation. In this example, a difference operator 405 is used with the current frame 302a and the predicted current frame 302b to obtain a motion compensation residual 205b. As described above, other operators or combinations of operators may also be used for computing the motion compensation residual 205b.

Figure 5:
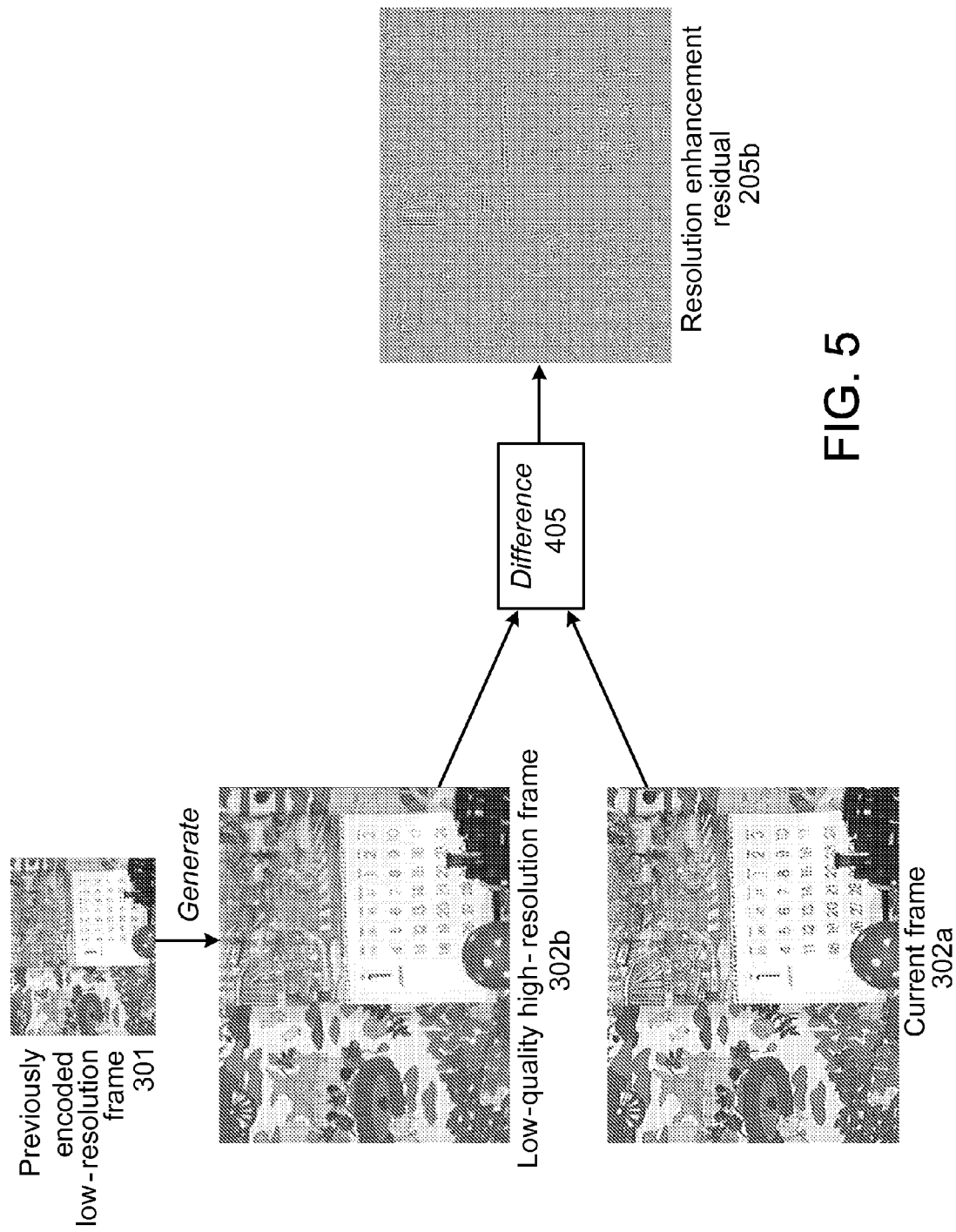
FIG. 5 is an example of obtaining a prediction residual frame in resolution enhancement.

Referring to FIG. 5, an example of obtaining a prediction residual frame in resolution enhancement is shown and described. In this example, a low-quality high-resolution frame 302b is generated from a previously encoded low-resolution frame 301. Generating the frame 302b from the frame 301 can be performed using upsampling and any interpolation techniques such as linear interpolation, nearest neighbor interpolation and bi cubic interpolation. In some implementations, filtering techniques such as anti-aliasing filtering may be used during generation of the predicted frame 302b from the frame 301. As mentioned with respect to FIG. 4, the low-quality high-resolution frame 302b and the current frame are then compared to each other to obtain the resolution enhancement prediction residual 205b. Even though a difference operator 405 is shown in FIG. 5, other operators may also be used to obtain the resolution enhancement residual 205b.

Figure 6:
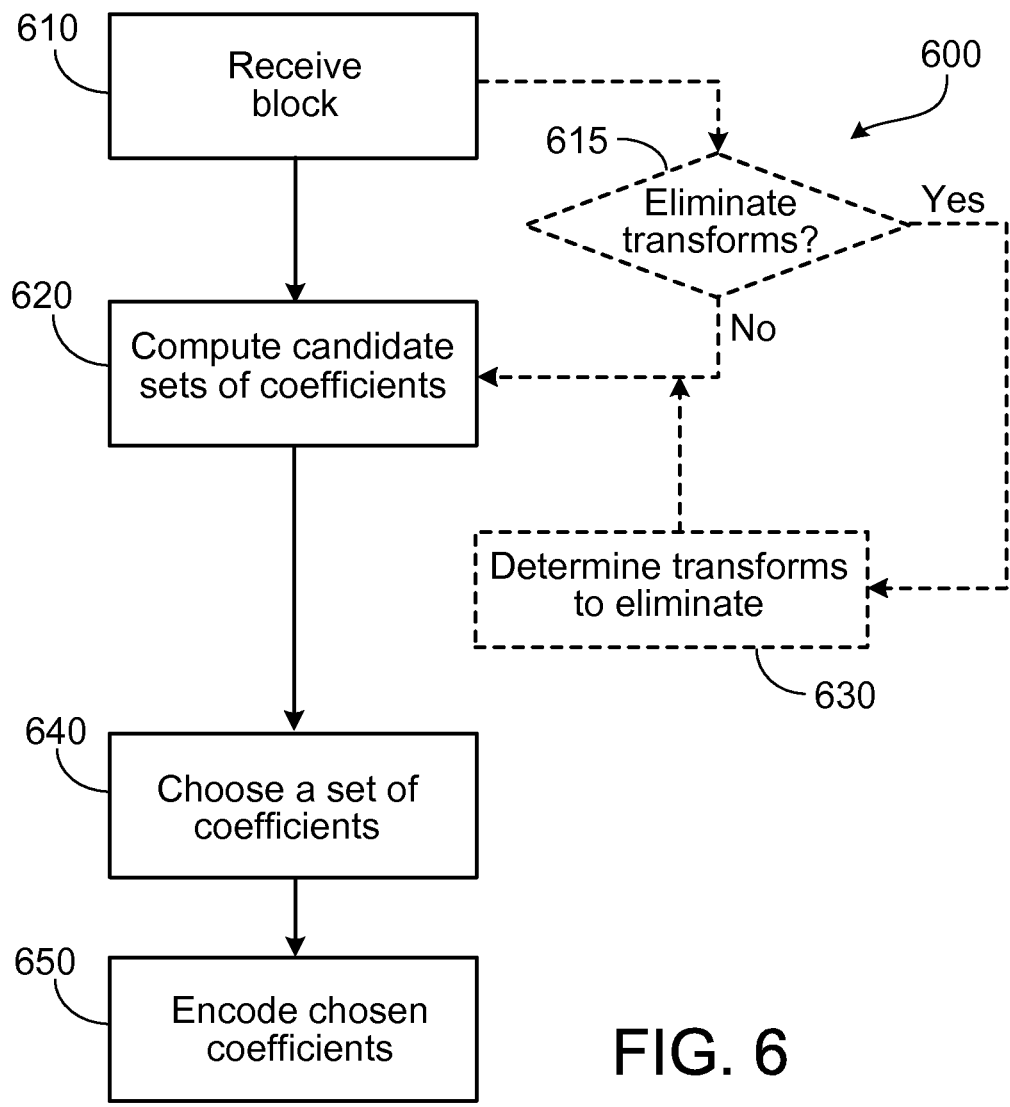
FIG. 6 is a flow diagram depicting a particular order of operations in a data compression and transmission system.

Referring now to FIG. 6, a flowchart 600 represents an exemplary arrangement of operations performed by the transform unit 215 in a data compression and transmission system. The operations can be performed on each of multiple blocks of a data array representing a frame or prediction residual. The operations select a set of coefficients for encoding a given block by comparing a group of multiple sets of coefficients and determining which of the sets of coefficients represents the block with a maximum compression (e.g., according to a given measure of compression efficiency). In this example, the operations include receiving 610 a block of the data array. Operations also include computing 620 multiple candidate sets of transform coefficients. Different sets of coefficients are computed using different transforms from a group of pre-determined transforms to allow the transform with the greatest ability to compress a given block to be used. For example, a first set of coefficients can be computed based on multiple 1-D transforms each computed over a different portion of the block, and together covering the entire block. The 1-D transforms can be aligned along a particular direction. Other sets of coefficients can be computed based on multiple 1-D transforms aligned along different directions (e.g., directions evenly spaced over a range of angles, as described in more detail below). Such 1-D transforms may exhibit the highest compression for features of a frame or prediction residual that include 1-D features. In some implementations, there are only a small number of sets of coefficients that are computed based on 1-D transforms. For example, it may be sufficient to calculate two sets of coefficients based on 1-D transforms, one set for a vertical direction, and another set for a horizontal direction, as described in more detail below. Another set of coefficients can be computed based on a 2-D transform performed over the entire block. Such a 2-D transform may exhibit the highest compression for features of a frame or prediction residual that include 2-D features. Operations also include choosing 640 a set of transform coefficients from the group of candidate sets of transform coefficients that provides the greatest compression, and encoding 650 the chosen coefficients.

Operations may optionally include determining 615 whether to attempt to eliminate any transforms from the group of pre-determined transforms (e.g., to decrease processing delay). In some cases, if the group of pre-determined transforms is large, it may be desirable to eliminate some of the transforms that are unlikely to provide high compression of a given block. That way, the processing time that would otherwise be needed to compute candidate transform coefficients based on those transforms can be avoided. If transforms are to be considered for elimination from the group of pre-determined transforms, the operations include determining 630 which, if any, of the transforms will be eliminated from consideration for computing any of the candidate sets of coefficients based on estimated characteristics of a given block and how a given transform would be likely to perform on a block with those characteristics. The time used to determine which transforms to eliminate should be less than the time it would have taken to compute the corresponding transform coefficients.

In some implementations, receiving 610 the block of the data array may include receiving the data array from an information source 101. The data array may be of any form and type including an image, a video frame, or a prediction residual frame. In some implementations the data array may be substantially similar to the data arrays 205 described with respect to FIGS. 2 and 3. Receiving 610 the data array may further include partitioning the data array into subparts as described in detail with respect to FIG. 2.

Operations may optionally include inspecting the received data array to determine 615 whether directional transforms are to be used for the data array. For example, if the data array is an image or a prediction residual with significant anisotropic features, it may be determined that directional transforms are to be used. On the other hand, if an image, video frame, or prediction residual is smooth and/or without directional edges, it may be determined that directional transforms are not necessary. In some implementations, the determination may be at least partly automated using one or more algorithms implemented via a computing device. Such automated procedures may include characterization of the image, video frame, or prediction residual.

Characterization of images, video frames, and prediction residuals may assist in determining whether directional transforms are used for a given image or frame. In some implementations, such characterization helps in determining the nature, direction or type of transform to be computed. The description below refers to prediction residuals in particular. However, the description can also apply to video frames and images.

In some cases, adapting the transform or representation to local anisotropic features in prediction residuals improves the compression performance. As an example, this is analyzed via characterization of an auto-covariance of a MC residual using a generalized version of the conventionally used separable first-order Markov model. The separable model and the generalized model are given below in (1) and (2), respectively.

$$R(I,J) = \rho_1^{|I|} \rho_2^{|J|}. \tag{1}$$

$$R(\theta,I,J) = \rho_1^{|I\cos(\theta)+J\sin(\theta)|} \rho_2^{|-I\sin(\theta)+J\cos(\theta)|}. \tag{2}$$

Figure 7A:
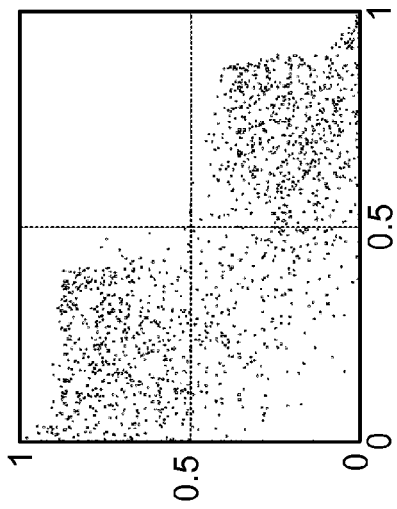
FIGS. 7A-7D show scatter plots related to an example described herein.
Figure 7B:
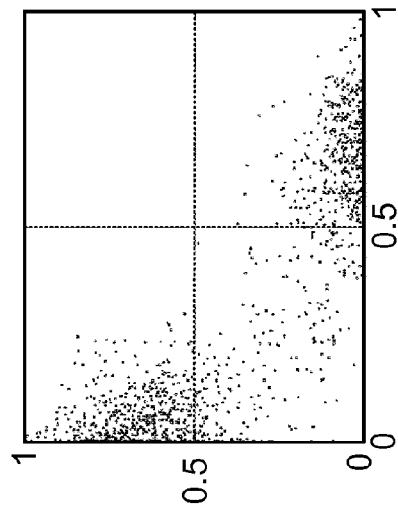
Figure 7C:
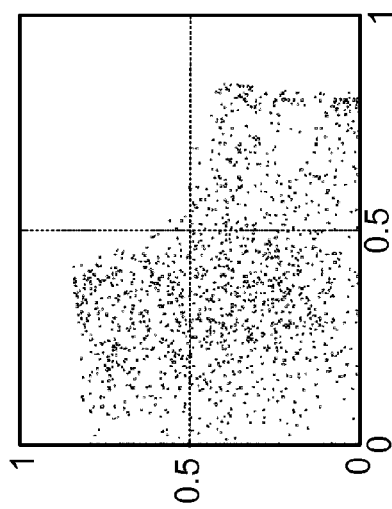
Figure 7D:
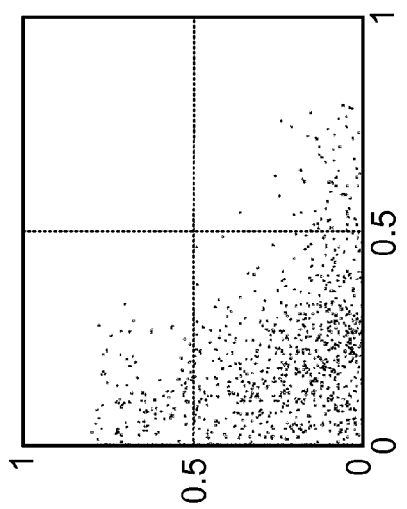

The generalized model is a rotated version of the separable model, where $\theta$ represents the amount of rotation. Setting it to zero reduces the generalized model to the separable model. In this example the parameters $\rho_1$ and $\rho_2$ for the separable model, and the parameters $\rho_1$, $\rho_2$ and $\theta$ for the generalized model are calculated from blocks of 8×8 pixels of an image and its MC-residual. A biased estimator is used to estimate the auto-covariance of the blocks and find the parameters $\rho_1$, $\rho_2$ and $\theta$ that minimize the mean-square-error between the auto-covariance estimate and the models in (1) and (2). FIGS. 7A and 7B show scatter plots of $\rho_1$ and $\rho_2$ estimated from the image for the separable and the generalized auto-covariance models, respectively. FIGS. 7C and 7D show scatter plots of the same parameters estimated from the MC-residual for the separable and the generalized auto-covariance models, respectively. The video sequence called "Mobile" is used for these examples because the sequence has various moving objects causing unsuccessful motion-compensated prediction at object boundaries.

For this example, in the plot of the generalized model (FIG. 7B), the region along the $\rho_1=\rho_2$ line is less populated by data points relative to the plot of the separable model (FIG. 7A). On the other hand, there are almost no data points beyond the $\rho_1=0.8$ and $\rho_2=0.8$ lines in the separable model. From these observations, we can see that in the generalized case, the data points lying below the $\rho_1=\rho_2$ line have been shifted along the $\rho_1$ axis towards the right, and the data points lying above the $\rho_1=\rho_2$ line have been shifted along the $\rho_2$ axis towards the top. In some cases, allowing an additional parameter $\theta$ in the model results in greater chances of higher correlation coefficients $\rho_1$ or $\rho_2$. In some cases, the parameter $\theta$ adjusts itself such that either $\rho_1$ or $\rho_2$ point along more regular variations than in the separable model.

Continuing with this example, it can be observed that in the plot with the separable auto-covariance model for the MC residual (FIG. 7C), the points seem to evenly fill up a region between a $\rho_2=k/\rho_1$ curve and the axes. In the plot with the generalized auto-covariance model for the MC residual (FIG. 7D), the points seem to concentrate towards the tails of that curve, forming semi-disks centered on the axes. In some cases, a better concentration of data points in a region may mean better predictability of data, which in turn may indicate that the model used in equation (2) can provide a more faithful characterization of the data. Therefore, in some cases, characterization with an additional parameter, $\theta$, may lead to a better compression of a data array.

Still referring to FIGS. 7B and 7D, the effects of the locally anisotropic features of the image on the MC-residual are also illustrated. In this example, the characterization of the image (FIG. 7B) has data points which are approximately concentrated in two disks tangent to the $\rho_1$ and $\rho_2$ axes. On the other hand, the characterization of the MC-residual (FIG. 7D) in this example seems to have its data points concentrated in two semi disks centered on the two axes. In other words, the data points move closer to the axes in the MC-residual case (FIG. 7D). In some cases, this may mean that given any data point $(\rho_1, \rho_2)$ in the image characterization (FIG. 7B), the smaller covariance factor becomes even smaller in the MC-residual characterization (FIG. 7D). In some implementations, this is how locally anisotropic features of images might affect or propagate to the MC-residual. This might constitute a major difference in the statistical characteristics between the image and the MC-residual. In such cases, separate direction-adaptive transforms may be used for images and MC-residuals.

In some implementations, a first candidate set of coefficients is computed by performing multiple one-dimensional transforms over different parts of a block of the received data array. The different parts of the block over which the one-dimensional transforms are performed can be arranged to cover all or most of the block, as described in more detail below. In such cases the first set of coefficients includes coefficients corresponding to each of the one-dimensional transforms. Each of the one-dimensional transforms may be chosen from discrete cosine transform (DCT), discrete sine transform (DST), discrete wavelet transform (DWT), and discrete Fourier transform (DFT). In some implementations, the transform used is the same for each of the one-dimensional transforms. In other implementations, at least one of the one-dimensional transforms is computed using a different transform from the rest.

In one example of eliminating one or more transforms from a group of pre-determined transforms to be used for computing candidate sets of coefficients, different sets of one-dimensional transforms can be selected for inclusion or elimination based on the direction associated with the transforms. The direction of a set of one-dimensional transforms that is likely to perform better on a given data array may be determined via inspection of the data array or via some operation on the data array. For example, the $\rho_1$ vs $\rho_2$ scatter plot of the MC-residual obtained with the generalized model in FIG. 7D indicates that often one of the two correlation coefficients, either $\rho_1$ or $\rho_2$, is significantly larger than the other. In some implementations, the data is decorrelated along the direction with the larger correlation coefficient. In other implementations, decorrelation may also be performed along the direction with a smaller correlation coefficient. In some implementations, the choice of direction may depend on whether the received data array is an image or a prediction residual. Alternatively, it is not necessary to perform any analysis on the data array and the coefficients for multiple directions evenly spaced over a range of angles (e.g., over a range of 180°) can all be computed. In such cases, the direction demonstrating the best energy compaction may be selected as the direction of choice.

Figure 8:
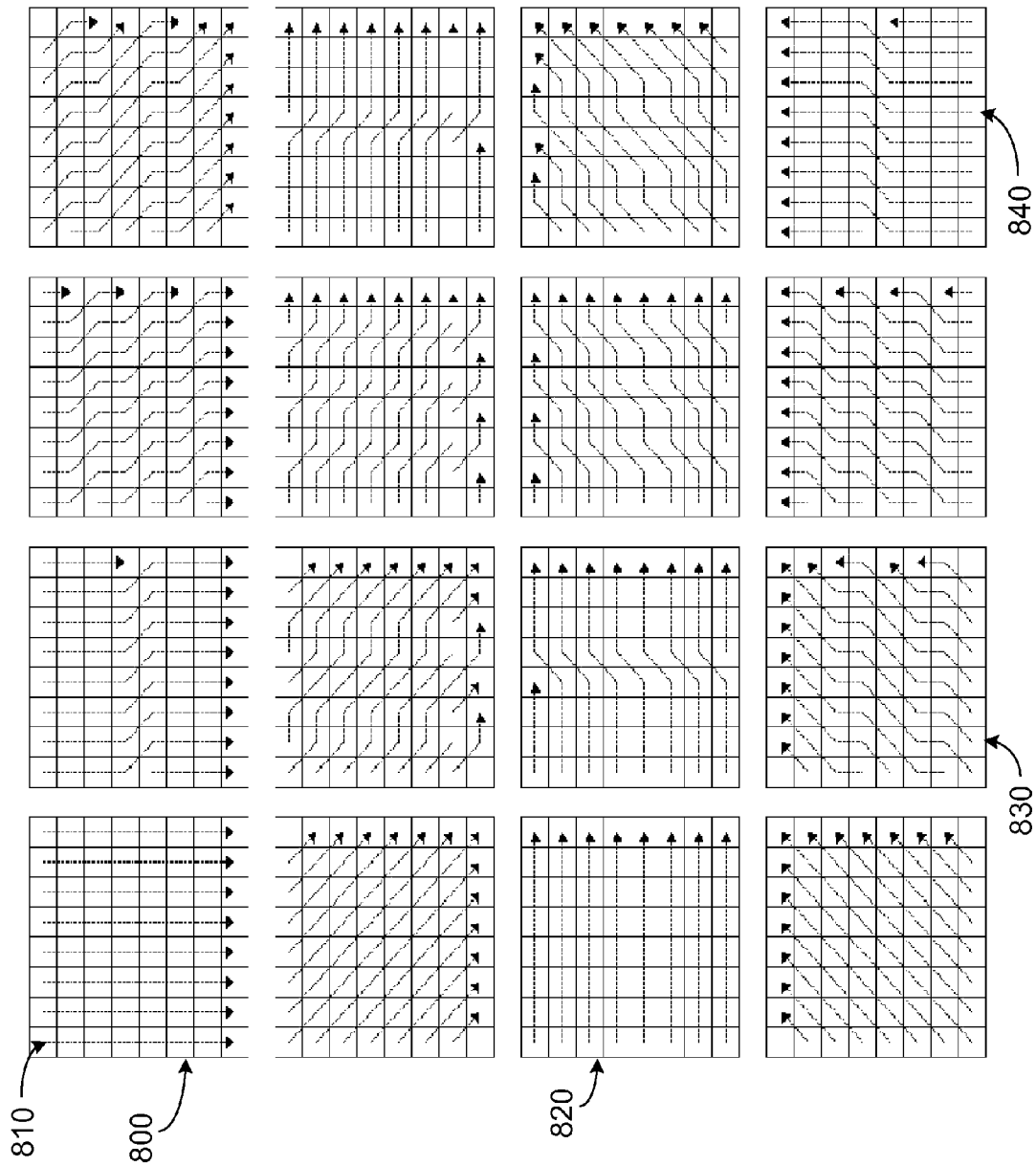
FIG. 8 is an example of a plurality of one-dimensional transforms computed over a data array.

Referring now to FIG. 8, an example is depicted where one-dimensional transforms are calculated over different one-dimensional arrays of pixels arranged in a predetermined pattern over a block (in this example 8×8 blocks). In this example, the one-dimensional array of pixels 810 (within transform pattern 800) consists of the eight leftmost pixels in the 8×8 block and represents an array over which a one-dimensional transform is computed. In some implementations, the arrays of pixels are chosen such that they form substantially linear paths approximately in one direction (e.g., such that each of the one-dimensional arrays in the pattern follows a path over the block with substantially the same shape, but with different lengths). This direction can be the direction of the large correlation coefficient as described with respect to FIG. 7.

In this example, sixteen transform patterns with directions covering approximately 180° have been defined for calculating the groups of one-dimensional transforms for each pattern. Since it is the average angle of the path traversing the array of pixels over which each one-dimensional transform is computed that affects the amount of compression of the transform and not where the computation starts and ends (represented by the arrow heads in FIG. 8), it is not necessary to include directions covering both 0° to 180° and 180° to 360°. Furthermore, it is not necessary to include transform patterns corresponding to both 0° and 180°. Thus, if transform pattern 800 represents a direction of 0°, transform pattern 840 represents a direction just short of 180°. In this example transforms over approximately linear paths along directions evenly spaced from about 0° to 180° are included, however, in other examples transforms along other directions or along paths with non-linear shapes may also be defined. In some implementations, it is sufficient to include only a small number of transform patterns. For example, one implementation includes transform patterns only in the vertical and horizontal directions, corresponding to transform patterns 800 and 820, respectively. In some implementations, defining a directional transform may include choosing a one-dimensional array of pixels within a received block such that the array as a whole represents an angle or orientation. Several arrays in a given direction may have a same or different number of pixels in them. For example, all one-dimensional arrays in the pattern 820 include the same number of pixels, while the arrays in transform pattern 830 have varying number of pixels. The arrays of pixels in a given transform pattern may be overlapping or non-overlapping. In other words, a given pixel may be traversed while computing two different one-dimensional transforms within the same transform pattern. The arrays of pixels may include most of the pixels in the block, but for some transform patterns, one or more pixels may be excluded. Some transform patterns may also extend beyond a given block, such that a given pixel is included in one-dimensional arrays of both of two neighboring blocks.

Figure 9:
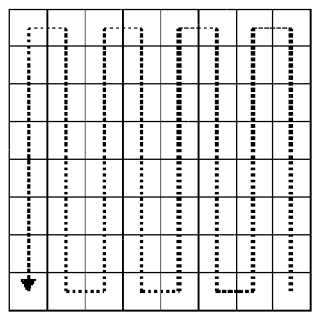
FIG. 9 shows examples of scanning patterns for a data array.
Figure 9:
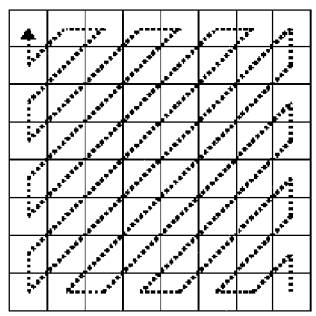
Figure 9:
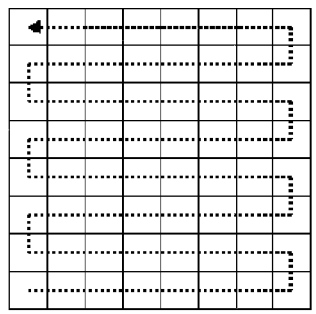
Figure 9:
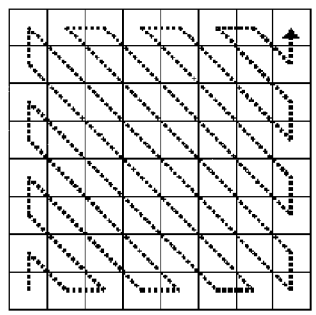
Figure 9:
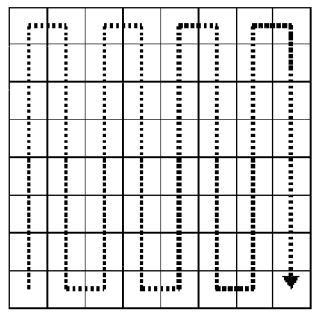

Coefficients resulting from the one-dimensional transforms of a given transform pattern are ordered into a stream of coefficients for further processing. As part of determining the order, the coefficients can be formed into a two-dimensional block of results with one dimension corresponding to different transforms and the other dimension corresponding to spatial frequency associated with a given coefficient. The coefficients can then be read from this two-dimensional block of results in a specific order known as a scanning pattern. In some implementations, the scanning patterns of the resulting transform coefficients depend on the orientation or direction of the transforms in the transform pattern. Typically, such scanning patterns may be defined such that lower frequency coefficients are scanned before higher frequency coefficients and/or such that a coefficient is read before or after a second coefficient stored in an adjacent location in the block of results. FIG. 9 depicts some example scanning patterns for 8×8 blocks of results data. In other implementations, scanning patterns may be defined based on the size of the block of results, expected nature of data, and orientation or direction of the transform used to compute the data.

Referring back again to FIG. 6, in some implementations, the first set of coefficients may be computed 620 using directional discrete wavelet transforms (DWT). Such directional wavelet transforms may involve the use of one or more of bandelets, directionlets or lifting based wavelet transforms. As an example, a lifting based directional wavelet transform is described below.

Figure 10A:
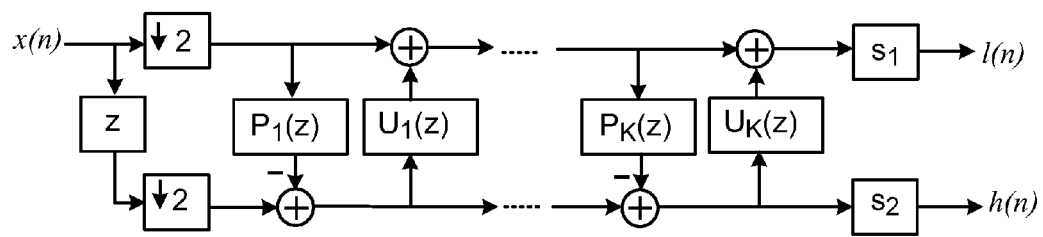
FIGS. 10A and 10B are block diagrams of an exemplary wavelet transform system.
Figure 10B:
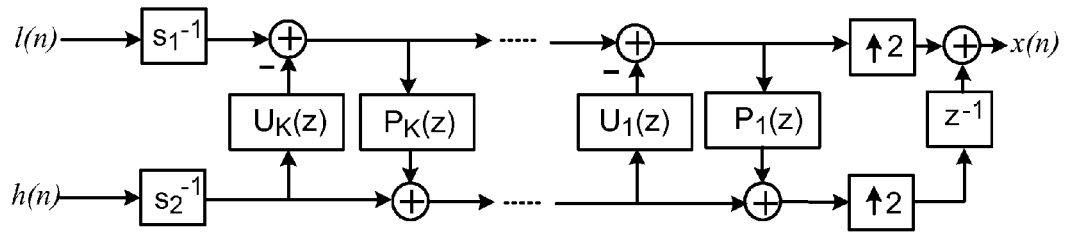

Lifting is a procedure to design wavelet transforms using a series of filtering steps called lifting steps. Referring now to FIG. 10A, a block diagram depicts an analysis side in a lifting based wavelet transform system. As shown in FIG. 10A, the signal is first divided into even and odd samples and the odd samples are predicted from the even samples. The residual in that prediction is then used to update the even samples. Any number of prediction and update pairs can be cascaded until the final low-pass and high-pass signals of the transform are obtained. The scheme shown in this example is invertible irrespective of how the prediction boxes ($P_i$) or update boxes ($U_i$) are chosen. The corresponding inverse transform is shown in FIG. 10B.

The filters used for prediction and update determine the analysis and synthesis filters of the DWT. For example, the prediction and update filters given below result in the well-known 9/7 biorthogonal wavelet filters. The prediction and update filters may be changed to realize other forms of wavelet filters. In the filters shown in this example, every odd sample is predicted by averaging and scaling the two neighboring even pixels, and every even pixel is updated by averaging and scaling the two neighboring odd pixels of the prediction residual.

$$P_1(z)=+1.58613(1+z^{-1}) \; U_1(z)=-0.05298(1+z^{+1})$$
$$P_2(z)=-0.88291(1+z^{-1}) \; U_2(z)=+0.44350(1+z^{+1})$$
$$s_1=1.23017 \; s_2=1/s_1$$

Figure 11B:
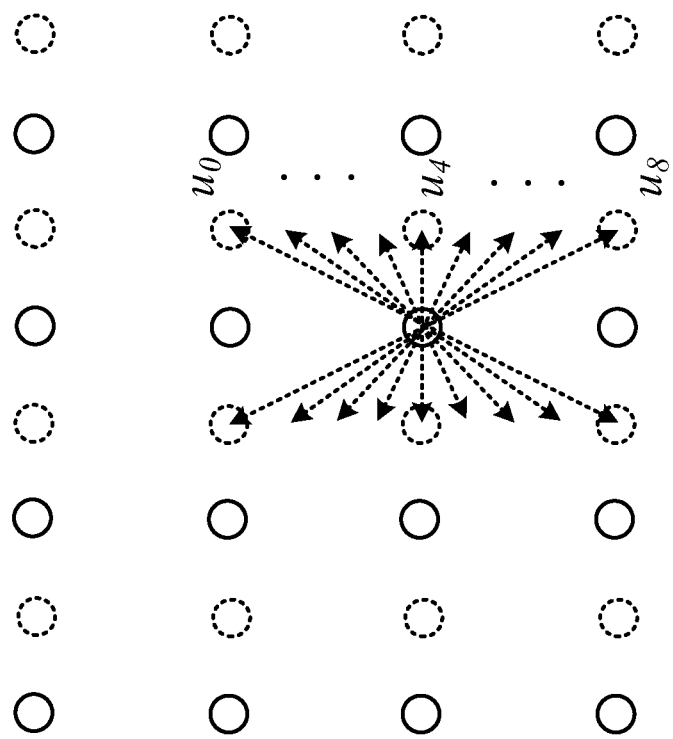
FIGS. 11A and 11B show examples of wavelet transform based directional prediction along vertical and horizontal directions, respectively.
Figure 11A:
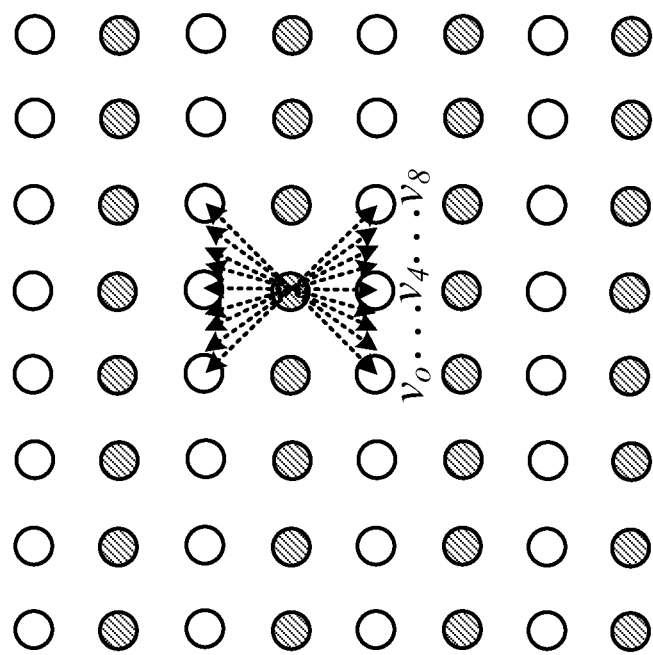

In some implementations, a lifting-based 1-D wavelet transform with directional prediction is performed by applying the directional lifting steps only in the vertical or horizontal dimension. In other words, when performing the transform along the vertical dimension, either one of the prediction and update options in FIG. 11A is performed, or no prediction and update is performed. If no prediction and update is performed along the vertical dimension, then one of the prediction and update options in FIG. 11B is used along the horizontal dimension. If one of the options in FIG. 11A is performed along the vertical dimension, then no prediction and update is performed along the horizontal dimension.

For prediction residuals, in some implementations, directional 1-D DWTs may be preferred over directional 2-D DWTs since the characteristics of prediction residuals are often more coherent with the basis functions of directional 1-D DWTs. In many cases, most of the energy of prediction residuals concentrates along edges and object boundaries, forming one-dimensional structures. As discussed above, in some cases transforms with basis functions whose support follow these one-dimensional structures can potentially perform better in approximating such regions of prediction residuals. However, in some cases, transforms with basis functions whose support follows a two-dimensional structure can potentially perform better.

Referring again to FIG. 6, operations may further include computing 630 at least one second set of coefficients from the received data array. In some implementations, the second set of coefficients is based on a two-dimensional (2-D) transform. For example, the second set of coefficients may be calculated using a 2-D discrete cosine transform, 2-D discrete sine transform (DST), 2-D discrete wavelet transform (DWT), and 2-D discrete Fourier transform (DFT).

Still referring to FIG. 6, operations may also include choosing 640 a set of coefficients from a group of multiple sets of coefficients that includes the first set of coefficients (e.g., from 1-D transforms over different portions of a block) and the second set of coefficients (e.g., from a 2-D transform over the whole block). Since there are many possible transform patterns over which the first set of coefficients can be computed, the group of multiple sets of coefficients can include a different set of 1-D transform coefficients for each of the transform patterns (e.g., one set for each of the transform patterns shown in FIG. 8), along with one or more sets of 2-D transform coefficients. Alternatively, some of the potential transform patterns may be eliminated from consideration based on estimated characteristics of a block without actually performing the transforms from all of the transform patterns. For example, the group of multiple sets of coefficients can include a single set of 1-D transform coefficients (estimated as the best potential match) and a single set of 2-D transform coefficients.

The set is chosen such that the chosen set best represents the received data array according to some cost function. For example, in some implementations, a set of transform coefficients that represents the least lossy compression of the received array may be chosen. In other implementations, choosing a best set of coefficients or a best transform for computing that set of coefficients may involve optimization methods involving one or more cost functions. For example, in one implementation, the best transform or set of coefficients for each block is chosen using a Rate Distortion (RD) optimized method. In this example, each available set of 1-D transforms and each available 2-D transform is computed on the block. Generally a set of directional 1-D transforms is computed in such a way that each individual 1-D transform covers at least a part of the block and the set collectively covers the entire block. In case of 2-D transforms, a single 2-D transform is computed over the entire block. A cost function is formed using a linear combination of the distortion (using a metric such as the mean squared error (MSE)) of the block and the number of bits spent on the block (both to encode the quantized coefficients and other related information) for each transform or set of transforms. The transform or set of transforms which has the smallest cost function is chosen for each block. In other implementations, any other cost function may be used along with other metrics such as sum of squared differences (SSD), sum of absolute differences (SAD), ratio image uniformity (RIU) and root mean squared error (RMSE). Information theory based metrics such as mutual information may also be used in the cost functions for measuring the distortion.

Choosing a set of coefficients also includes defining or selecting one or more parameters related to the chosen set of coefficients. The one or more parameters may qualitatively and/or quantitatively identify the chosen set of coefficients. For example, a parameter may indicate whether the chosen set of coefficients or transform relates to a set of 1-D transforms or a 2-D transform. A parameter may also be used to identify one or more of a type of the transform, a direction of the transform (e.g., one of multiple predetermined transform patterns), a scanning pattern, and a block or group of pixels on which the transform is computed.

The operations may further include encoding the chosen set of coefficients and or one or more parameters related to the chosen set of coefficients. In some implementations, such encoding includes one or more of source coding and channel coding. For example, in one implementation, the chosen transform or set of transforms for each block is encoded using variable-length-codes (VLC). Separate codeword lengths may be used for representing the 1-D and 2-D transform coefficients. In one example of an encoded parameter indicating which transform or set of transforms was used, a single bit codeword is used to denote that a 2-D DCT has been used and a 5-bit codeword is used to represent which one of the plurality of one-dimensional transforms has been used. In some implementations, Huffman codes may be used for the encoding. In other implementations the choice of coding scheme may be made to simplify implementation and/or approximate the optimal Huffman codes for the average times the transforms are typically used. In some implementations, the transform coefficients and the related parameters are encoded using a substantially same coding scheme. In other implementations, the coding schemes used for the transform coefficients and the related parameters are different from each other. Other methods and coding schemes may also be used to encode the transform and/or the related parameters.

The systems and methods have been described above primarily with respect to a transmitter or sender side in a communication system. Corresponding receiver devices can be configured to decode and display information transmitted in accordance with the systems and methods described herein. Typically such receiver devices will have functional units that perform inverse operations of operations performed at the receiver. The choice of which of multiple possible inverse operations should be performed for a given block (e.g., which of multiple possible inverse transforms) is determined based on parameters encoded along with a given the given block. For example, the receiver stores information identifying a group of multiple transforms that could be performed and information identifying multiple transform patterns over which 1-D transforms could be performed. The appropriate transform and/or transform pattern is selected based on the encoded parameter. For example, a one-bit parameter can indicate whether a 1-D or 2-D transform was used to encode a given block. Then if a 1-D transform was used, a 4-bit parameter can indicate which of 16 transform patterns was used.

The following results show some advantages of the methods and systems described herein. The experimental results are purely for illustrative purposes and should not be considered to be limiting in any sense.

One experiment has been carried out to compare the compression performances of the 2-D DCT and 16 sets of 1-D DCT's, against only the 2-D DCT. In these experiments, QCIF resolution video sequences at 30 frames-per-second were used. Some of the important encoder parameters are as follows. The first frame is encoded as an I-frame, and all the remaining frames are coded as P-frames. Quarter-pixel resolution full-search motion-estimation with adaptive block-sizes (16×16, 16×8 8×16, 8×8) are used. Entropy coding is performed with context-adaptive variable-length-codes (CAVLC).

Figure 13A:
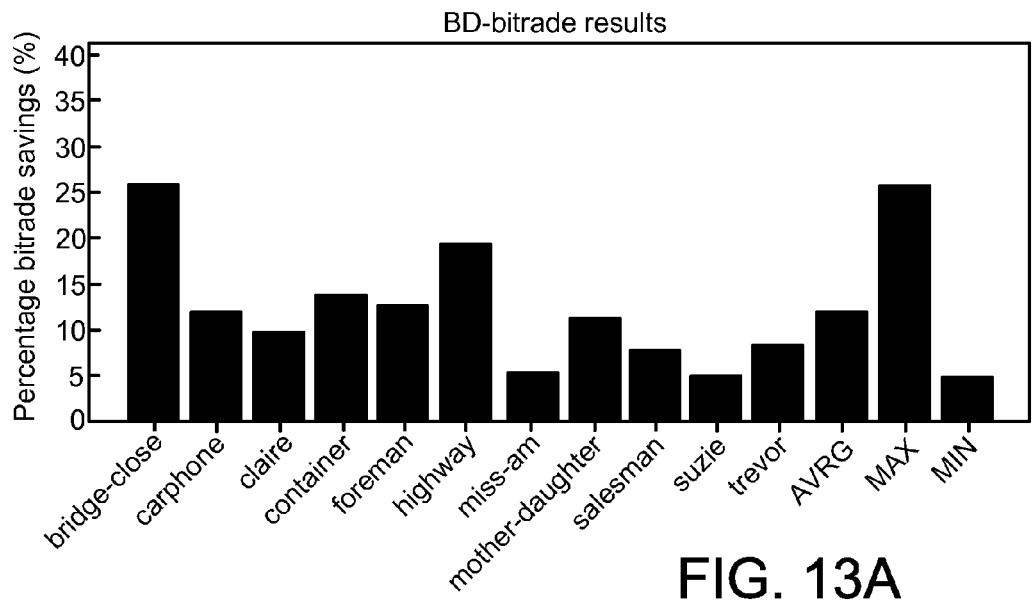
FIGS. 13A and 13B show plots related to experimental results using discrete cosine transforms.
Figure 13B:
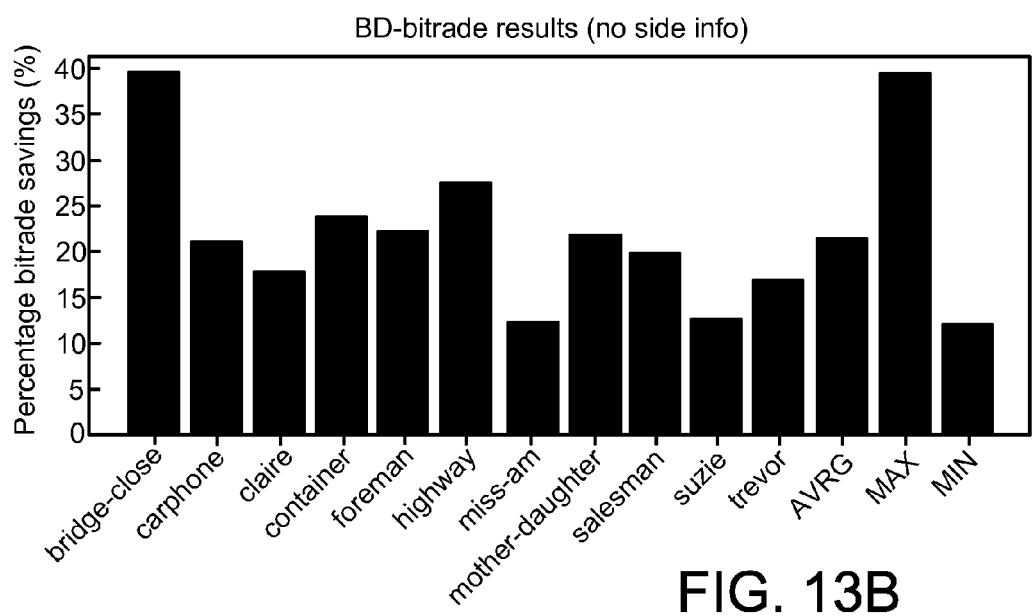

The results of the experiments are shown with the Bjontegaard-Delta (BD) bitrate metric using the following quantization parameters: 24, 28, 32, 36. The BD-bitrate metric indicates the average bitrate savings (in terms of percentage) of the codec with the proposed transforms (2-D DCT together with 16 sets of 1-D DCT's) compared to using the conventional transform, the 2-D DCT. FIGS. 13A and 13B show the bitrate savings obtained when the methods and systems described herein are used relative to when conventional methods and systems are used. FIG. 13A shows percentage bitrate savings when the additional information (or side information), indicating the chosen transform for each block, is taken into account. FIG. 13B shows percentage bitrate savings when the additional information is not taken into account. As seen in these examples, for QCIF resolution sequences, bitrate savings up to 25.8% (with an average of approximately 12%) are achieved. When the side information or additional information bits are neglected, the ultimate achievable bitrate savings are as high as 40.3% with an average of approximately 21.7%.

Further, some more examples using one-dimensional wavelet transforms and two-dimensional wavelet transforms illustrate the advantages of the methods and systems described herein. In these examples, prediction residual frames from a total of 10 CIF resolution video sequences were used. From each sequence, a specific frame was used to compute its motion-compensated residual (with 8×8-pixel blocks and quarter-pixel motion estimation), and its resolution-enhancement residual (interpolated from QCIF resolution using the method in the reference software of H.264/AVC). Specifically, a total of 20 (=10×2) prediction residual frames were compressed with each of the following transforms: 2-D separable DWT (2D-sep-DWT), 2-D directional DWTs (2D-dir-DWTs), and 1-D directional DWTs and 2-D separable DWT (1D-dir-DWTs+2D-sep-DWT). The prediction options that are shown in FIGS. 11A and 11B were used. The best transform (i.e., prediction option) was selected in a local region (8×8-pixel block) with rate-distortion optimization. The lifting filters that were used in the experiments are the ones of the 9/7 biorthogonal wavelet filters.

Compression performance was evaluated with peak signal to noise ration (PSNR) and the number of nonzero transform coefficients (NONTC) after thresholding. In this example, since entropy coding was not performed, the bitrate was not used. Additional information needed to transmit the chosen transforms for each local region was also not taken into account. 2-D-dir-DWTs require one out of 81(=9×9) transforms for each block, while 1D-dir-DWTs+2D sep-DWT require one out of 20(=2×9+1+1) transforms. The 2D-sep-DWT, however, may not need transmission of the additional information. Typically, the increase in the bitrate due to the additional information does not overshadow the gains achieved from using directional transforms. To summarize the comparison results at different compression ratios, the Bjontegaard-Delta coefficient (BD-coefficient) and the Bjontegaard-Delta PSNR (BD-PSNR) metrics were used. These metrics measure, respectively, the average number of coefficient savings and the average PSNR improvement between two PSNR-NONTC curves. Each curve was formed from four PSNR-NONTC data points with varying PSNR levels ranging from around 30 dB to 45 dB. For the comparisons, the curve produced by the 2D-sep-DWT was considered as one of the two curves. The other curve is that produced by the transform-combination that is compared with the 2D-sep-DWT.

Figure 12A:
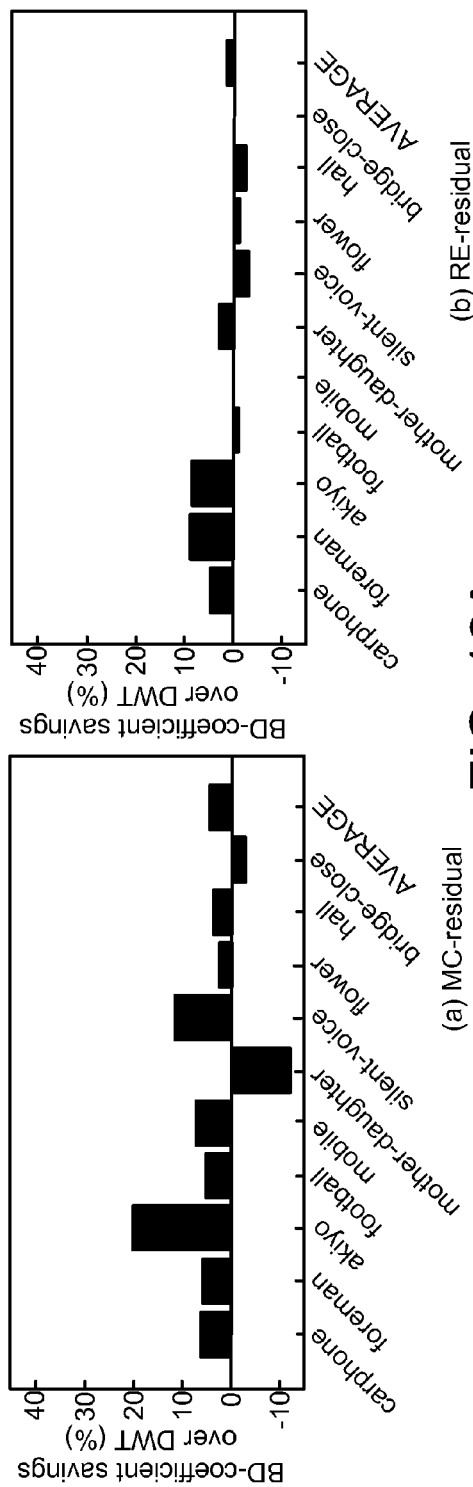
FIGS. 12A and 12B show plots related to experimental results using discrete wavelet transforms.
Figure 12B:
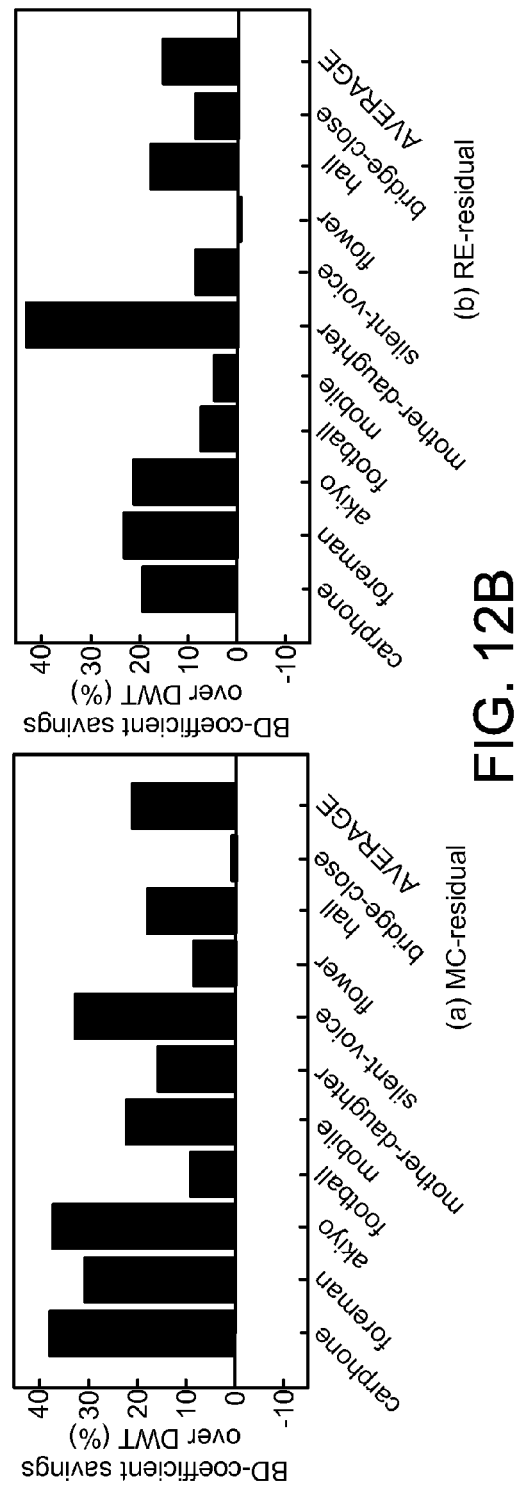

FIGS. 12A and 12B summarize the results of the experiments. FIG. 12A shows the BD-coefficient savings of 2D-dir-DWTs over the 2D-sep-DWT on MC-residuals and RE-residuals. FIG. 12B shows the BD-coefficient savings of 1D-dir-DWTs+2D-sep-DWT over the 2D-sep-DWT on MC-residuals and RE-residuals.

FIGS. 12A and 12B show that for the different video files considered, 1D-dir-DWTs combined with the 2D-sep-DWT performs much better at compressing prediction residuals than 2D-dir-DWTs alone. In these examples for MC-residuals, the 2D-dir-DWTs require 5% fewer coefficients on average than the 2D-sep-DWT for MC-residuals, and the 1D-dir-DWTs and 2D-sep-DWT combination requires 21% fewer coefficients than the 2D-sep-DWT. For RE-residuals, the savings are on average 2% if 2D-dir-DWTs are used, and 15% if the 1D-dir-DWTs and 2D-sep-DWT combination is used.

In these examples, 2D-dir-DWTs provide on average 0.10 dB PSNR improvement over the 2D-sep-DWT for MC-residuals, the 1D-dir-DWTs and 2D-sep-DWT combination provides on average 0.33 dB PSNR improvement over the 2D-sep DWT. For RE-residuals, the improvements are on average 0.05 dB if 2D-dir-DWTs are used, and 0.53 dB if the 1D-dir-DWTs and 2D-sep-DWT combination is used.

These examples indicate that using the 2-D DCT together with 16 sets of 1-D DCT's can perform much better at compressing prediction residuals, such as the motion-compensation-residual, than using only the 2-D DCT. Similarly, they indicate that using one-dimensional directional wavelet transforms in addition to the two-dimensional separable wavelet transform can perform much better at compressing prediction residuals than using only two-dimensional directional wavelet transforms or the two-dimensional separable wavelet transform.

The compression techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a communication medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Other implementations are within the scope of the following claims.

What is claimed is:

1. A method of encoding data, the method comprising:
   computing a first set of coefficients based on a plurality of transforms each computed over a different portion of an array of data, a second set of coefficients based on a plurality of transforms each computed over a different portion of the array of data, and a third set of coefficients based on a transform computed over the array of data;
   choosing a set of coefficients to represent the array of data from a group of multiple sets of coefficients, the group including the first set of coefficients, the second set of coefficients, and the third set of coefficients; and
   encoding the chosen coefficients and one or more parameters related to the chosen coefficients.

2. The method of claim 1, wherein the plurality of transforms on which the first set of coefficients are based are aligned along a first direction.

3. The method of claim 2, wherein the plurality of transforms on which the second set of coefficients are based are aligned along a second direction different from the first direction.

4. The method of claim 3, wherein the second direction is 90° from the first direction.

5. The method of claim 3, wherein the group of multiple sets of coefficients consists of two sets of coefficients that are based on a plurality of transforms, and one or more sets of coefficients that are based on a single transform.

6. The method of claim 1, wherein the group of multiple sets of coefficients consists of: the first set of coefficients based a plurality of transforms aligned along a vertical direction, the second set of coefficients based on a plurality of transforms aligned along a horizontal direction, and one or more sets of coefficients that are based on a single transform.

7. The method of claim 1, wherein the plurality of transforms each computed over a different portion of the array of data comprise a plurality of one-dimensional transforms.

8. The method of claim 7, wherein computing the first set of coefficients includes dividing the array of data into a plurality of one-dimensional arrays.

9. The method of claim 8, wherein the plurality of one-dimensional arrays are non-overlapping.

10. The method of claim 8, wherein one or more of the plurality of one-dimensional arrays are overlapping.

11. The method of claim 8, wherein the first set of coefficients includes coefficients resulting from the plurality of one-dimensional transforms each computed over a different one of the plurality of one-dimensional arrays.

12. The method of claim 8, wherein the group of multiple sets of coefficients includes the first set of coefficients, the second set of coefficients, the third set of coefficients, and one or more additional sets of coefficients.

13. The method of claim 12, wherein each of one or more of the additional sets of coefficients is computed based on a plurality of transforms each computed over a different portion of the array of data.

14. The method of claim 13, wherein computing a given one of the additional sets of coefficients includes dividing the array of data into a plurality of one-dimensional arrays that cover most of the array of data, and computing a one-dimensional transform over each of the plurality of one-dimensional arrays.

15. The method of claim 14, wherein different ones of the additional sets use different patterns of one-dimensional arrays to cover most of the array of data.

16. The method of claim 15, wherein different patterns correspond to different directions for the one-dimensional arrays.

17. The method of claim 12, wherein at least one of the additional sets of coefficients is computed based on a transform computed over the array of data.

18. The method of claim 12, wherein the one or more parameters identify one of a plurality of scanning patterns used to order a list of coefficients in the first set of coefficients.

19. The method of claim 18, wherein the scanning pattern identified depends on which of the candidate sets of coefficients is chosen as the first set of coefficients.

20. The method of claim 12, wherein the first set of coefficients is chosen from among the plurality of candidate sets of coefficients based on which of the candidate sets of coefficients represents the array of data with a maximum compression.

21. The method of claim 7, wherein the one or more parameters identify at least one transform used to generate the chosen first or third set of coefficients.

22. The method of claim 21, wherein the one or more parameters identify a pre-defined pattern of one-dimensional arrays over which the plurality of transforms are computed if the first set of coefficients is chosen.

23. The method of claim 7, wherein the transform computed over the array of data comprises a two-dimensional transform.

24. The method of claim 23, wherein the one or more parameters identify one of multiple two-dimensional transforms used to compute the third set of coefficients if the third set of coefficients is chosen.

25. The method of claim 23, wherein the two-dimensional transform comprises a two-dimensional discrete cosine transform.

26. The method of claim 23, wherein the two-dimensional transform comprises a two-dimensional discrete wavelet transform.

27. The method of claim 7, wherein at least one of the plurality of one-dimensional transforms comprises a discrete cosine transform.

28. The method of claim 7, wherein at least one of the plurality of one-dimensional transforms comprises a discrete wavelet transform.

29. The method of claim 1, wherein one set of coefficients of the group of multiple sets of coefficients is chosen to represent the array of data based on which set of coefficients represents the array of data with a maximum compression.

30. The method of claim 1, wherein each set of coefficients in the group of multiple sets of coefficients is computed based on at least one transform from a group of multiple transforms.

31. The method of claim 30, wherein the group of multiple transforms includes the plurality of transforms on which computation of the first set of coefficients is based and the transform on which computation of the third set of coefficients is based.

32. The method of claim 31, further comprising, before computing the first and third sets of coefficients, eliminating one or more transforms from the group of multiple transforms from consideration for computing any of the group of multiple sets of coefficients based on estimated characteristics of the array of data.

33. The method of claim 1, wherein encoding the chosen coefficients includes discarding at least one coefficient based on a predetermined threshold.

34. The method of claim 1, wherein the array of data is associated with a video frame.

35. The method of claim 34, wherein the array of data corresponds to a block of pixels of the video frame.

36. The method of claim 34, wherein the array of data is associated with a residual computed from two video frames.

37. The method of claim 36, wherein the residual is based on motion compensation between the two video frames.

38. The method of claim 36, wherein the residual is based on resolution enhancement between the two video frames.

39. The method of claim 36, wherein the residual is obtained by subtracting pixel values of one of the frames from corresponding pixel values in another of the frames.

40. A method of encoding blocks of a video residual, the method comprising:
computing a first set of coefficients based on a plurality of one-dimensional transforms each computed over a different portion of a block, a second set of coefficients based on a plurality of transforms each computed over a different portion of the array of data, and a third set of coefficients based on a two-dimensional transform computed over the block;
choosing a set of coefficients to represent the block from a group of multiple sets of coefficients, the group including the first set of coefficients, the second set of coefficients, and the third set of coefficients; and
encoding the chosen coefficients and one or more parameters related to the chosen coefficients.

41. A non-transitory computer-readable medium storing a computer program for encoding data, the computer program comprising instructions for causing a computer system to:
compute a first set of coefficients based on a plurality of transforms each computed over a different portion of an array of data, a second set of coefficients based on a plurality of transforms each computed over a different portion of the array of data, and a third set of coefficients based on a transform computed over the array of data;
choose a set of coefficients to represent the array of data from a group of multiple sets of coefficients, the group including the first set of coefficients, the second set of coefficients, and the third set of coefficients; and
encode the chosen coefficients and one or more parameters related to the chosen coefficients.

42. A method of decoding data that has been encoded using a method comprising computing a first set of coefficients based on a plurality of transforms each computed over a different portion of an array of data, a second set of coefficients based on a plurality of transforms each computed over a different portion of the array of data, and a third set of coefficients based on a transform computed over the array of data, and choosing a set of coefficients to represent the array of data from a group of multiple sets of coefficients, the group including the first set of coefficients, the second set of coefficients, and the third set of coefficients, the method of decoding the data comprising:
receiving encoded coefficients and one or more parameters related to the encoded coefficients; and
computing an inverse transform on the encoded coefficients to generate the array of data, where the inverse transform is based on a transform indicated by at least one of the parameters related to the encoded coefficients.

43. The method of claim 42, wherein the plurality of transforms on which the first set of coefficients are based are aligned along a first direction.

44. The method of claim 43, wherein the plurality of transforms on which the second set of coefficients are based are aligned along a second direction different from the first direction.

45. The method of claim 44, wherein the second direction is 90° from the first direction.

46. The method of claim 44, wherein the group of multiple sets of coefficients consists of two sets of coefficients that are based on a plurality of transforms, and one or more sets of coefficients that are based on a single transform.

47. The method of claim 42, wherein the group of multiple sets of coefficients consists of: the first set of coefficients based a plurality of transforms aligned along a vertical direction, the second set of coefficients based on a plurality of transforms aligned along a horizontal direction, and one or more sets of coefficients that are based on a single transform.

48. The method of claim 42, wherein the plurality of transforms each computed over a different portion of the array of data comprise a plurality of one-dimensional transforms.

49. The method of claim 48, wherein computing the first set of coefficients includes dividing the array of data into a plurality of one-dimensional arrays.

50. The method of claim 49, wherein the plurality of one-dimensional arrays are non-overlapping.

51. The method of claim 49, wherein one or more of the plurality of one-dimensional arrays are overlapping.

52. The method of claim 49, wherein the first set of coefficients includes coefficients resulting from the plurality of one-dimensional transforms each computed over a different one of the plurality of one-dimensional arrays.

53. The method of claim 49, wherein the group of multiple sets of coefficients includes the first set of coefficients, the second set of coefficients, the third set of coefficients, and one or more additional sets of coefficients.

54. The method of claim 53, wherein each of one or more of the additional sets of coefficients is computed based on a plurality of transforms each computed over a different portion of the array of data.

55. The method of claim 54, wherein computing a given one of the additional sets of coefficients includes dividing the array of data into a plurality of one-dimensional arrays that cover most of the array of data, and computing a one-dimensional transform over each of the plurality of one-dimensional arrays.

56. The method of claim 55, wherein different ones of the additional sets use different patterns of one-dimensional arrays to cover most of the array of data.

57. The method of claim 56, wherein different patterns correspond to different directions for the one-dimensional arrays.

58. The method of claim 53, wherein at least one of the additional sets of coefficients is computed based on a transform computed over the array of data.

59. The method of claim 53, wherein the one or more parameters identify one of a plurality of scanning patterns used to order a list of coefficients in the first set of coefficients.

60. The method of claim 59, wherein the scanning pattern identified depends on which of the candidate sets of coefficients is chosen as the first set of coefficients.

61. The method of claim 53, wherein the first set of coefficients is chosen from among the plurality of candidate sets of coefficients based on which of the candidate sets of coefficients represents the array of data with a maximum compression.

62. The method of claim 48, wherein the one or more parameters identify at least one transform used to generate the chosen first or third set of coefficients.

63. The method of claim 62, wherein the one or more parameters identify a pre-defined pattern of one-dimensional arrays over which the plurality of transforms are computed if the first set of coefficients is chosen.

64. The method of claim 48, wherein the transform computed over the array of data comprises a two-dimensional transform.

65. The method of claim 64, wherein the one or more parameters identify one of multiple two-dimensional transforms used to compute the third set of coefficients if the third set of coefficients is chosen.

66. The method of claim 64, wherein the two-dimensional transform comprises a two-dimensional discrete cosine transform.

67. The method of claim 64, wherein the two-dimensional transform comprises a two-dimensional discrete wavelet transform.

68. The method of claim 48, wherein at least one of the plurality of one-dimensional transforms comprises a discrete cosine transform.

69. The method of claim 48, wherein at least one of the plurality of one-dimensional transforms comprises a discrete wavelet transform.

70. The method of claim 42, wherein one set of coefficients of the group of multiple sets of coefficients is chosen to represent the array of data based on which set of coefficients represents the array of data with a maximum compression.

71. The method of claim 42, wherein each set of coefficients in the group of multiple sets of coefficients is computed based on at least one transform from a group of multiple transforms.

72. The method of claim 71, wherein the group of multiple transforms includes the plurality of transforms on which computation of the first set of coefficients is based and the transform on which computation of the third set of coefficients is based.

73. The method of claim 72, wherein the encoding further comprises, before computing the first and third sets of coefficients, eliminating one or more transforms from the group of multiple transforms from consideration for computing any of the group of multiple sets of coefficients based on estimated characteristics of the array of data.

74. The method of claim 42, wherein encoding the chosen coefficients includes discarding at least one coefficient based on a predetermined threshold.

75. The method of claim 42, wherein the array of data is associated with a video frame.

76. The method of claim 75, wherein the array of data corresponds to a block of pixels of the video frame.

77. The method of claim 75, wherein the array of data is associated with a residual computed from two video frames.

78. The method of claim 77, wherein the residual is based on motion compensation between the two video frames.

79. The method of claim 77, wherein the residual is based on resolution enhancement between the two video frames.

80. The method of claim 77, wherein the residual is obtained by subtracting pixel values of one of the frames from corresponding pixel values in another of the frames.

81. A non-transitory computer-readable medium storing a computer program for decoding data that has been encoded using a method comprising computing a first set of coefficients based on a plurality of transforms each computed over a different portion of an array of data, a second set of coefficients based on a plurality of transforms each computed over a different portion of the array of data, and a third set of coefficients based on a transform computed over the array of data, and choosing a set of coefficients to represent the array of data from a group of multiple sets of coefficients, the group including the first set of coefficients, the second set of coefficients, and the third set of coefficients, the computer program comprising instructions for causing a computer system to:

receive encoded coefficients and one or more parameters related to the encoded coefficients; and compute an inverse transform on the encoded coefficients to generate the array of data, where the inverse transform is based on a transform indicated by at least one of the parameters related to the encoded coefficients.

82. A system, comprising:

a transmitter configured to compute a first set of coefficients based on a plurality of transforms each computed over a different portion of an array of data, a second set of coefficients based on a plurality of transforms each computed over a different portion of the array of data, and a third set of coefficients based on a transform computed over the array of data, choose a set of coefficients to represent the array of data from a group of multiple sets of coefficients, the group including the first set of coefficients, the second set of coefficients, and the third set of coefficients, and encode the chosen coefficients and one or more parameters related to the chosen coefficients; and one or more receivers, each receiver configured to receive encoded coefficients and one or more parameters related to the encoded coefficients from the transmitter, and compute an inverse transform on the encoded coefficients to generate the array of data, where the inverse transform is based on a transform indicated by at least one of the parameters related to the encoded coefficients.

83. The system of claim 82, wherein the plurality of transforms on which the first set of coefficients are based are aligned along a first direction.

84. The system of claim 83, wherein the plurality of transforms on which the second set of coefficients are based are aligned along a second direction different from the first direction.

85. The system of claim 84, wherein the second direction is 90° from the first direction.

86. The system of claim 84, wherein the group of multiple sets of coefficients consists of two sets of coefficients that are based on a plurality of transforms, and one or more sets of coefficients that are based on a single transform.

87. The system of claim 82, wherein the group of multiple sets of coefficients consists of: the first set of coefficients based a plurality of transforms aligned along a vertical direction, the second set of coefficients based on a plurality of transforms aligned along a horizontal direction, and one or more sets of coefficients that are based on a single transform.

88. The system of claim 82, wherein the plurality of transforms each computed over a different portion of the array of data comprise a plurality of one-dimensional transforms.

89. The system of claim 88, wherein computing the first set of coefficients includes dividing the array of data into a plurality of one-dimensional arrays.

90. The system of claim 89, wherein the plurality of one-dimensional arrays are non-overlapping.

91. The system of claim 89, wherein one or more of the plurality of one-dimensional arrays are overlapping.

92. The system of claim 89, wherein the first set of coefficients includes coefficients resulting from the plurality of one-dimensional transforms each computed over a different one of the plurality of one-dimensional arrays.

93. The system of claim 89, wherein the group of multiple sets of coefficients includes the first set of coefficients, the second set of coefficients, the third set of coefficients, and one or more additional sets of coefficients.

94. The system of claim 93, wherein each of one or more of the additional sets of coefficients is computed based on a plurality of transforms each computed over a different portion of the array of data.

95. The system of claim 94, wherein computing a given one of the additional sets of coefficients includes dividing the array of data into a plurality of one-dimensional arrays that cover most of the array of data, and computing a one-dimensional transform over each of the plurality of one-dimensional arrays.

96. The system of claim 95, wherein different ones of the additional sets use different patterns of one-dimensional arrays to cover most of the array of data.

97. The system of claim 96, wherein different patterns correspond to different directions for the one-dimensional arrays.

98. The system of claim 93, wherein at least one of the additional sets of coefficients is computed based on a transform computed over the array of data.

99. The system of claim 93, wherein the one or more parameters identify one of a plurality of scanning patterns used to order a list of coefficients in the first set of coefficients.

100. The system of claim 99, wherein the scanning pattern identified depends on which of the candidate sets of coefficients is chosen as the first set of coefficients.

101. The system of claim 93, wherein the first set of coefficients is chosen from among the plurality of candidate sets of coefficients based on which of the candidate sets of coefficients represents the array of data with a maximum compression.

102. The system of claim 88, wherein the one or more parameters identify at least one transform used to generate the chosen first or third set of coefficients.

103. The system of claim 102, wherein the one or more parameters identify a pre-defined pattern of one-dimensional arrays over which the plurality of transforms are computed if the first set of coefficients is chosen.

104. The system of claim 88, wherein the transform computed over the array of data comprises a two-dimensional transform.

105. The system of claim 104, wherein the one or more parameters identify one of multiple two-dimensional transforms used to compute the third set of coefficients if the third set of coefficients is chosen.

106. The system of claim 104, wherein the two-dimensional transform comprises a two-dimensional discrete cosine transform.

107. The system of claim 104, wherein the two-dimensional transform comprises a two-dimensional discrete wavelet transform.

108. The system of claim 88, wherein at least one of the plurality of one-dimensional transforms comprises a discrete cosine transform.

109. The system of claim 88, wherein at least one of the plurality of one-dimensional transforms comprises a discrete wavelet transform.

110. The system of claim 82, wherein one set of coefficients of the group of multiple sets of coefficients is chosen to represent the array of data based on which set of coefficients represents the array of data with a maximum compression.

111. The system of claim 82, wherein each set of coefficients in the group of multiple sets of coefficients is computed based on at least one transform from a group of multiple transforms.

112. The system of claim 111, wherein the group of multiple transforms includes the plurality of transforms on which computation of the first set of coefficients is based and the transform on which computation of the third set of coefficients is based.

113. The system of claim 112, wherein the transmitter is further configured to, before computing the first and third sets of coefficients, eliminate one or more transforms from the group of multiple transforms from consideration for computing any of the group of multiple sets of coefficients based on estimated characteristics of the array of data.

114. The system of claim 82, wherein encoding the chosen coefficients includes discarding at least one coefficient based on a predetermined threshold.

115. The system of claim 82, wherein the array of data is associated with a video frame.

116. The system of claim 115, wherein the array of data corresponds to a block of pixels of the video frame.

117. The system of claim 115, wherein the array of data is associated with a residual computed from two video frames.

118. The system of claim 117, wherein the residual is based on motion compensation between the two video frames.

119. The system of claim 117, wherein the residual is based on resolution enhancement between the two video frames.

120. The system of claim 117, wherein the residual is obtained by subtracting pixel values of one of the frames from corresponding pixel values in another of the frames.

121. The non-transitory computer-readable medium of claim 41, wherein the plurality of transforms on which the first set of coefficients are based are aligned along a first direction.

122. The non-transitory computer-readable medium of claim 121, wherein the plurality of transforms on which the second set of coefficients are based are aligned along a second direction different from the first direction.

123. The non-transitory computer-readable medium of claim 122, wherein the second direction is 90° from the first direction.

124. The non-transitory computer-readable medium of claim 122, wherein the group of multiple sets of coefficients consists of two sets of coefficients that are based on a plurality of transforms, and one or more sets of coefficients that are based on a single transform.

125. The non-transitory computer-readable medium of claim 41, wherein the group of multiple sets of coefficients consists of: the first set of coefficients based a plurality of transforms aligned along a vertical direction, the second set of coefficients based on a plurality of transforms aligned along a horizontal direction, and one or more sets of coefficients that are based on a single transform.

126. The non-transitory computer-readable medium of claim 41, wherein the plurality of transforms each computed over a different portion of the array of data comprise a plurality of one-dimensional transforms.

127. The non-transitory computer-readable medium of claim 126, wherein computing the first set of coefficients includes dividing the array of data into a plurality of one-dimensional arrays.

128. The non-transitory computer-readable medium of claim 127, wherein the plurality of one-dimensional arrays are non-overlapping.

129. The non-transitory computer-readable medium of claim 127, wherein one or more of the plurality of one-dimensional arrays are overlapping.

130. The non-transitory computer-readable medium of claim 127, wherein the first set of coefficients includes coefficients resulting from the plurality of one-dimensional transforms each computed over a different one of the plurality of one-dimensional arrays.

131. The non-transitory computer-readable medium of claim 127, wherein the group of multiple sets of coefficients includes the first set of coefficients, the second set of coefficients, the third set of coefficients, and one or more additional sets of coefficients.

132. The non-transitory computer-readable medium of claim 131, wherein each of one or more of the additional sets of coefficients is computed based on a plurality of transforms each computed over a different portion of the array of data.

133. The non-transitory computer-readable medium of claim 132, wherein computing a given one of the additional sets of coefficients includes dividing the array of data into a plurality of one-dimensional arrays that cover most of the array of data, and computing a one-dimensional transform over each of the plurality of one-dimensional arrays.

134. The non-transitory computer-readable medium of claim 133, wherein different ones of the additional sets use different patterns of one-dimensional arrays to cover most of the array of data.

135. The non-transitory computer-readable medium of claim 134, wherein different patterns correspond to different directions for the one-dimensional arrays.

136. The non-transitory computer-readable medium of claim 131, wherein at least one of the additional sets of coefficients is computed based on a transform computed over the array of data.

137. The non-transitory computer-readable medium of claim 131, wherein the one or more parameters identify one of a plurality of scanning patterns used to order a list of coefficients in the first set of coefficients.

138. The non-transitory computer-readable medium of claim 137, wherein the scanning pattern identified depends on which of the candidate sets of coefficients is chosen as the first set of coefficients.

139. The non-transitory computer-readable medium of claim 131, wherein the first set of coefficients is chosen from among the plurality of candidate sets of coefficients based on which of the candidate sets of coefficients represents the array of data with a maximum compression.

140. The non-transitory computer-readable medium of claim 126, wherein the one or more parameters identify at least one transform used to generate the chosen first or third set of coefficients.

141. The non-transitory computer-readable medium of claim 140, wherein the one or more parameters identify a pre-defined pattern of one-dimensional arrays over which the plurality of transforms are computed if the first set of coefficients is chosen.

142. The non-transitory computer-readable medium of claim 126, wherein the transform computed over the array of data comprises a two-dimensional transform.

143. The non-transitory computer-readable medium of claim 142, wherein the one or more parameters identify one of multiple two-dimensional transforms used to compute the third set of coefficients if the third set of coefficients is chosen.

144. The non-transitory computer-readable medium of claim 142, wherein the two-dimensional transform comprises a two-dimensional discrete cosine transform.

145. The non-transitory computer-readable medium of claim 142, wherein the two-dimensional transform comprises a two-dimensional discrete wavelet transform.

146. The non-transitory computer-readable medium of claim 126, wherein at least one of the plurality of one-dimensional transforms comprises a discrete cosine transform.

147. The non-transitory computer-readable medium of claim 126, wherein at least one of the plurality of one-dimensional transforms comprises a discrete wavelet transform.

148. The non-transitory computer-readable medium of claim 41, wherein one set of coefficients of the group of multiple sets of coefficients is chosen to represent the array of data based on which set of coefficients represents the array of data with a maximum compression.

149. The non-transitory computer-readable medium of claim 41, wherein each set of coefficients in the group of multiple sets of coefficients is computed based on at least one transform from a group of multiple transforms.

150. The non-transitory computer-readable medium of claim 149, wherein the group of multiple transforms includes the plurality of transforms on which computation of the first set of coefficients is based and the transform on which computation of the third set of coefficients is based.

151. The non-transitory computer-readable medium of claim 150, further comprising, before computing the first and third sets of coefficients, eliminating one or more transforms from the group of multiple transforms from consideration for computing any of the group of multiple sets of coefficients based on estimated characteristics of the array of data.

152. The non-transitory computer-readable medium of claim 41, wherein encoding the chosen coefficients includes discarding at least one coefficient based on a predetermined threshold.

153. The non-transitory computer-readable medium of claim 41, wherein the array of data is associated with a video frame.

154. The non-transitory computer-readable medium of claim 153, wherein the array of data corresponds to a block of pixels of the video frame.

155. The non-transitory computer-readable medium of claim 153, wherein the array of data is associated with a residual computed from two video frames.

156. The non-transitory computer-readable medium of claim 155, wherein the residual is based on motion compensation between the two video frames.

157. The non-transitory computer-readable medium of claim 155, wherein the residual is based on resolution enhancement between the two video frames.

158. The non-transitory computer-readable medium of claim 155, wherein the residual is obtained by subtracting pixel values of one of the frames from corresponding pixel values in another of the frames.

159. The non-transitory computer-readable medium of claim 81, wherein the plurality of transforms on which the first set of coefficients are based are aligned along a first direction.

160. The non-transitory computer-readable medium of claim 159, wherein the plurality of transforms on which the second set of coefficients are based are aligned along a second direction different from the first direction.

161. The non-transitory computer-readable medium of claim 160, wherein the second direction is 90° from the first direction.

162. The non-transitory computer-readable medium of claim 160, wherein the group of multiple sets of coefficients consists of two sets of coefficients that are based on a plurality of transforms, and one or more sets of coefficients that are based on a single transform.

163. The non-transitory computer-readable medium of claim 81, wherein the group of multiple sets of coefficients consists of: the first set of coefficients based a plurality of transforms aligned along a vertical direction, the second set of coefficients based on a plurality of transforms aligned along a horizontal direction, and one or more sets of coefficients that are based on a single transform.

164. The non-transitory computer-readable medium of claim 81, wherein the plurality of transforms each computed over a different portion of the array of data comprise a plurality of one-dimensional transforms.

165. The non-transitory computer-readable medium of claim 164, wherein computing the first set of coefficients includes dividing the array of data into a plurality of one-dimensional arrays.

166. The non-transitory computer-readable medium of claim 165, wherein the plurality of one-dimensional arrays are non-overlapping.

167. The non-transitory computer-readable medium of claim 165, wherein one or more of the plurality of one-dimensional arrays are overlapping.

168. The non-transitory computer-readable medium of claim 165, wherein the first set of coefficients includes coefficients resulting from the plurality of one-dimensional transforms each computed over a different one of the plurality of one-dimensional arrays.

169. The non-transitory computer-readable medium of claim 165, wherein the group of multiple sets of coefficients includes the first set of coefficients, the second set of coefficients, the third set of coefficients, and one or more additional sets of coefficients.

170. The non-transitory computer-readable medium of claim 169, wherein each of one or more of the additional sets of coefficients is computed based on a plurality of transforms each computed over a different portion of the array of data.

171. The non-transitory computer-readable medium of claim 170, wherein computing a given one of the additional sets of coefficients includes dividing the array of data into a plurality of one-dimensional arrays that cover most of the array of data, and computing a one-dimensional transform over each of the plurality of one-dimensional arrays.

172. The non-transitory computer-readable medium of claim 171, wherein different ones of the additional sets use different patterns of one-dimensional arrays to cover most of the array of data.

173. The non-transitory computer-readable medium of claim 172, wherein different patterns correspond to different directions for the one-dimensional arrays.

174. The non-transitory computer-readable medium of claim 169, wherein at least one of the additional sets of coefficients is computed based on a transform computed over the array of data.

175. The non-transitory computer-readable medium of claim 169, wherein the one or more parameters identify one of a plurality of scanning patterns used to order a list of coefficients in the first set of coefficients.

176. The non-transitory computer-readable medium of claim 175, wherein the scanning pattern identified depends on which of the candidate sets of coefficients is chosen as the first set of coefficients.

177. The non-transitory computer-readable medium of claim 169, wherein the first set of coefficients is chosen from among the plurality of candidate sets of coefficients based on which of the candidate sets of coefficients represents the array of data with a maximum compression.

178. The non-transitory computer-readable medium of claim 164, wherein the one or more parameters identify at least one transform used to generate the chosen first or third set of coefficients.

179. The non-transitory computer-readable medium of claim 178, wherein the one or more parameters identify a pre-defined pattern of one-dimensional arrays over which the plurality of transforms are computed if the first set of coefficients is chosen.

180. The non-transitory computer-readable medium of claim 164, wherein the transform computed over the array of data comprises a two-dimensional transform.

181. The non-transitory computer-readable medium of claim 180, wherein the one or more parameters identify one of multiple two-dimensional transforms used to compute the third set of coefficients if the third set of coefficients is chosen.

182. The non-transitory computer-readable medium of claim 180, wherein the two-dimensional transform comprises a two-dimensional discrete cosine transform.

183. The non-transitory computer-readable medium of claim 180, wherein the two-dimensional transform comprises a two-dimensional discrete wavelet transform.

184. The non-transitory computer-readable medium of claim 164, wherein at least one of the plurality of one-dimensional transforms comprises a discrete cosine transform.

185. The non-transitory computer-readable medium of claim 164, wherein at least one of the plurality of one-dimensional transforms comprises a discrete wavelet transform.

186. The non-transitory computer-readable medium of claim 81, wherein one set of coefficients of the group of multiple sets of coefficients is chosen to represent the array of data based on which set of coefficients represents the array of data with a maximum compression.

187. The non-transitory computer-readable medium of claim 81, wherein each set of coefficients in the group of multiple sets of coefficients is computed based on at least one transform from a group of multiple transforms.

188. The non-transitory computer-readable medium of claim 187, wherein the group of multiple transforms includes the plurality of transforms on which computation of the first set of coefficients is based and the transform on which computation of the third set of coefficients is based.

189. The non-transitory computer-readable medium of claim 188, further comprising, before computing the first and third sets of coefficients, eliminating one or more transforms from the group of multiple transforms from consideration for computing any of the group of multiple sets of coefficients based on estimated characteristics of the array of data.

190. The non-transitory computer-readable medium of claim 81, wherein encoding the chosen coefficients includes discarding at least one coefficient based on a predetermined threshold.

191. The non-transitory computer-readable medium of claim 81, wherein the array of data is associated with a video frame.

192. The non-transitory computer-readable medium of claim 191, wherein the array of data corresponds to a block of pixels of the video frame.

193. The non-transitory computer-readable medium of claim 191, wherein the array of data is associated with a residual computed from two video frames.

194. The non-transitory computer-readable medium of claim 193, wherein the residual is based on motion compensation between the two video frames.

195. The non-transitory computer-readable medium of claim 193, wherein the residual is based on resolution enhancement between the two video frames.

196. The non-transitory computer-readable medium of claim 193, wherein the residual is obtained by subtracting pixel values of one of the frames from corresponding pixel values in another of the frames.

* * * * *